Figure 14:
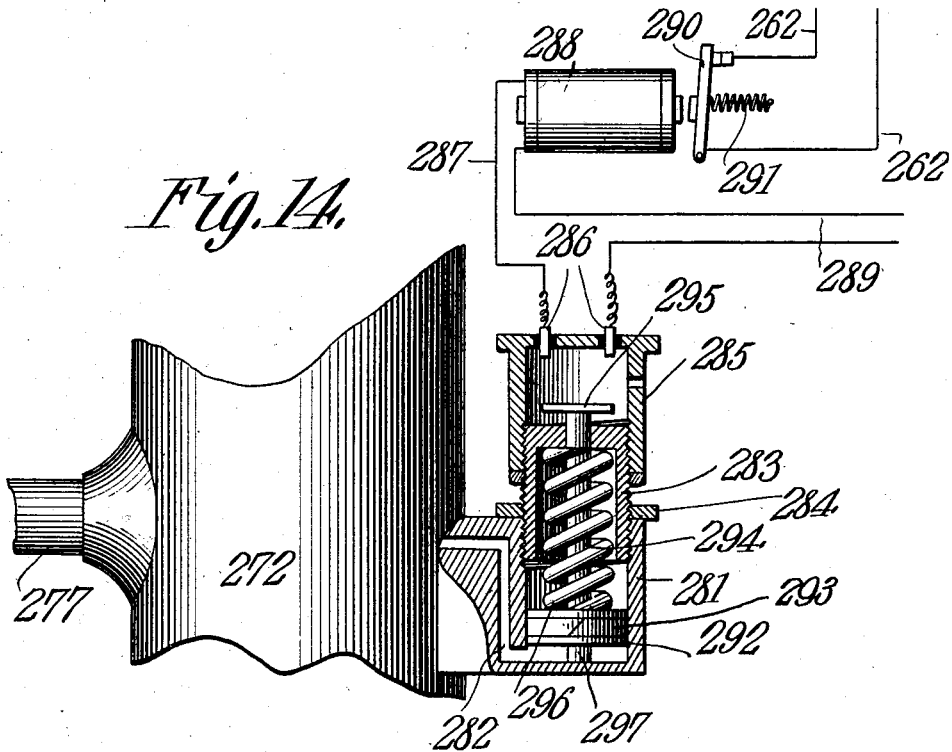

No. 897,218. PATENTED AUG. 25, 1908.
W. C. MAYO.
ELECTRICALLY OPERATED AIR BRAKE SYSTEM.
APPLICATION FILED NOV. 22, 1907.
8 SHEETS—SHEET 1.
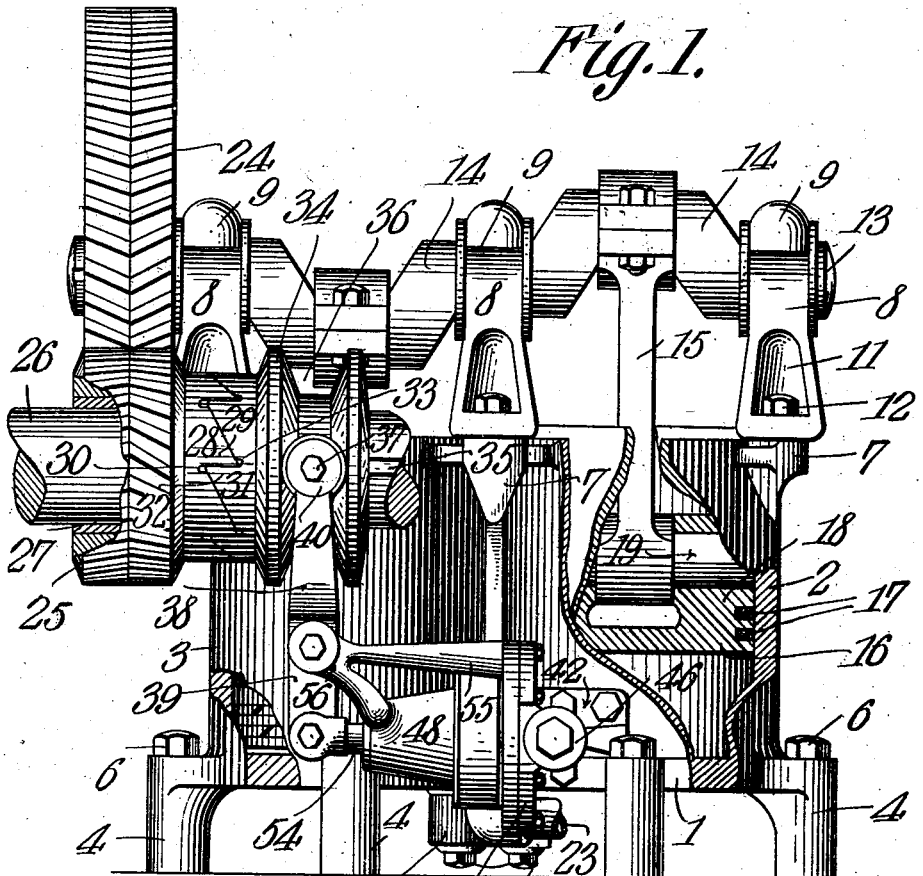
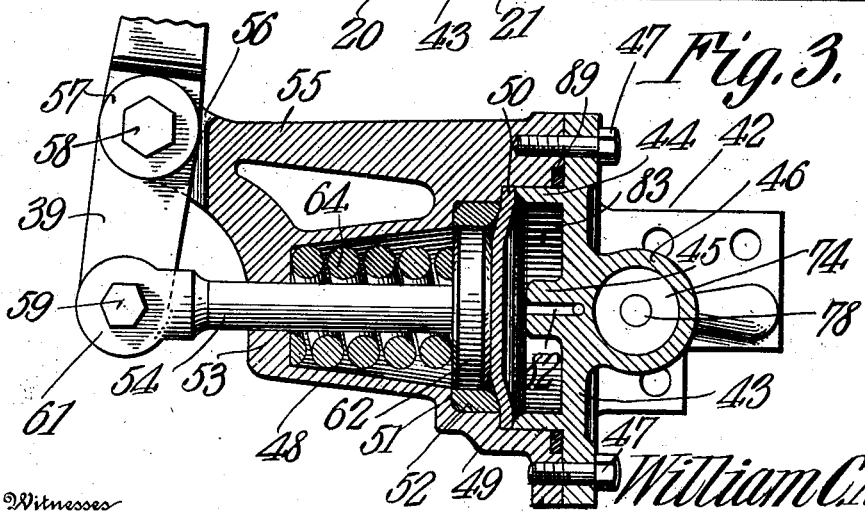
Inventor
William C. Mayo.
Witnesses
By C. A. Snow & Co.
Attorneys

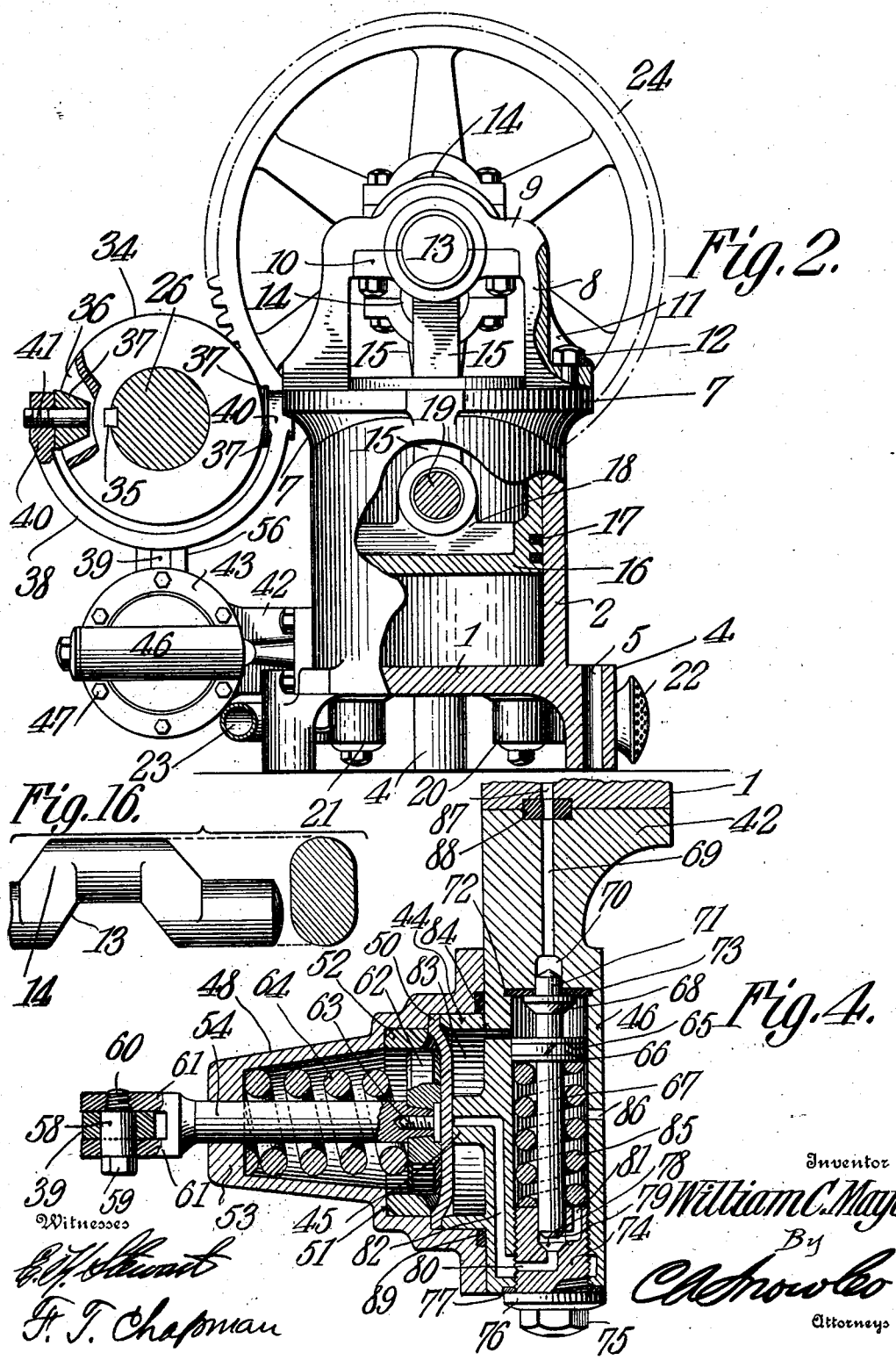

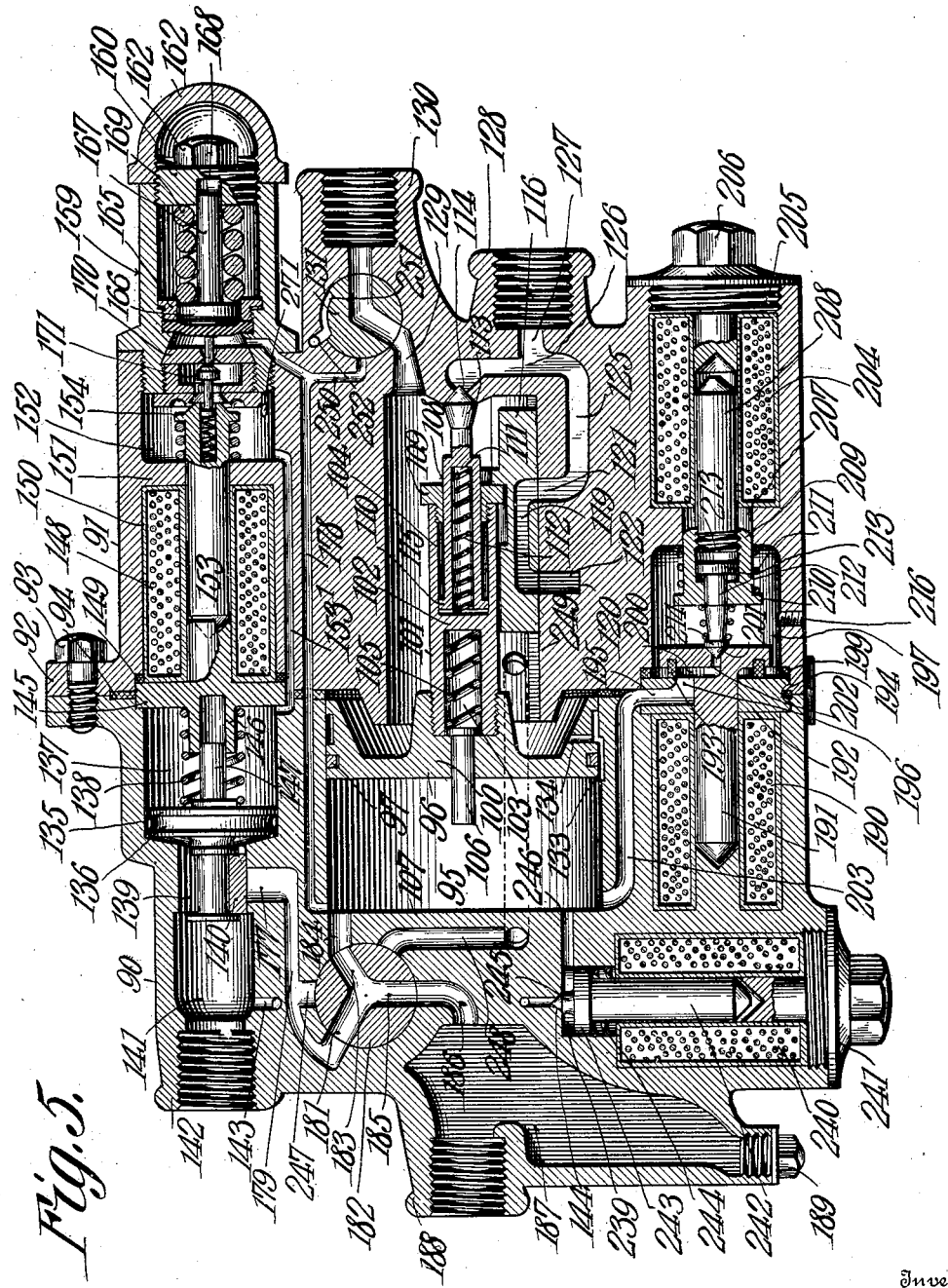

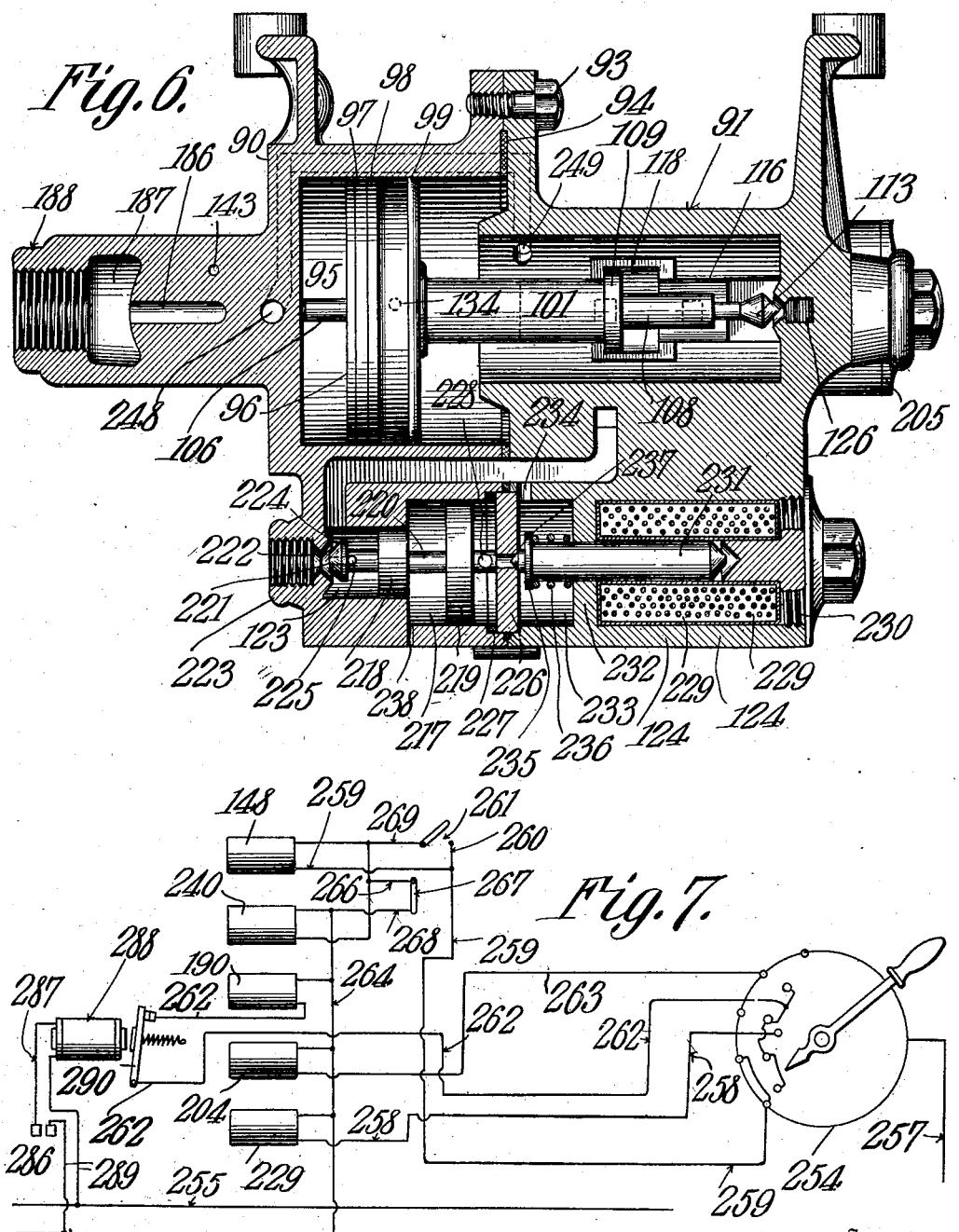

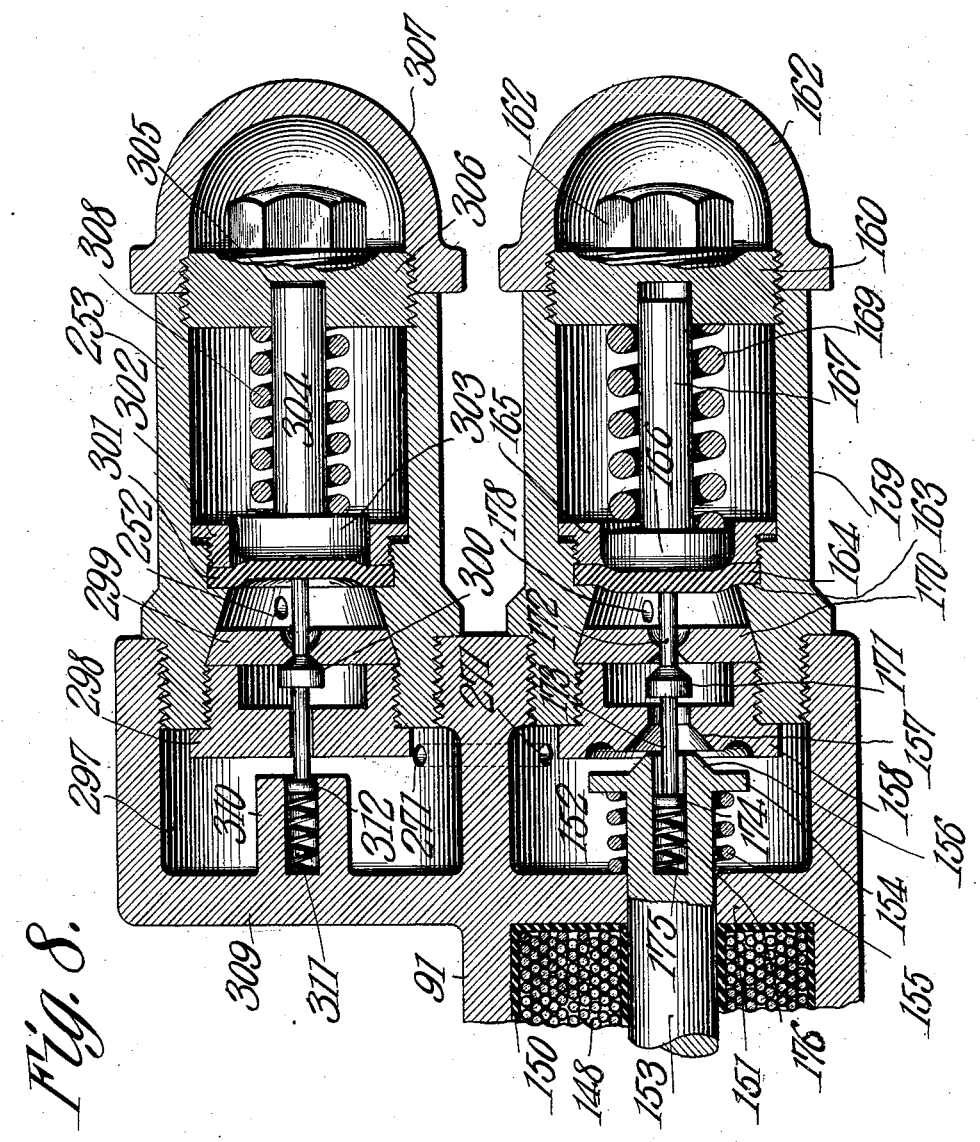

No. 897,218.
PATENTED AUG. 25, 1908.
W. C. MAYO.
ELECTRICALLY OPERATED AIR BRAKE SYSTEM.
APPLICATION FILED NOV. 22, 1907.
8 SHEETS—SHEET 6.
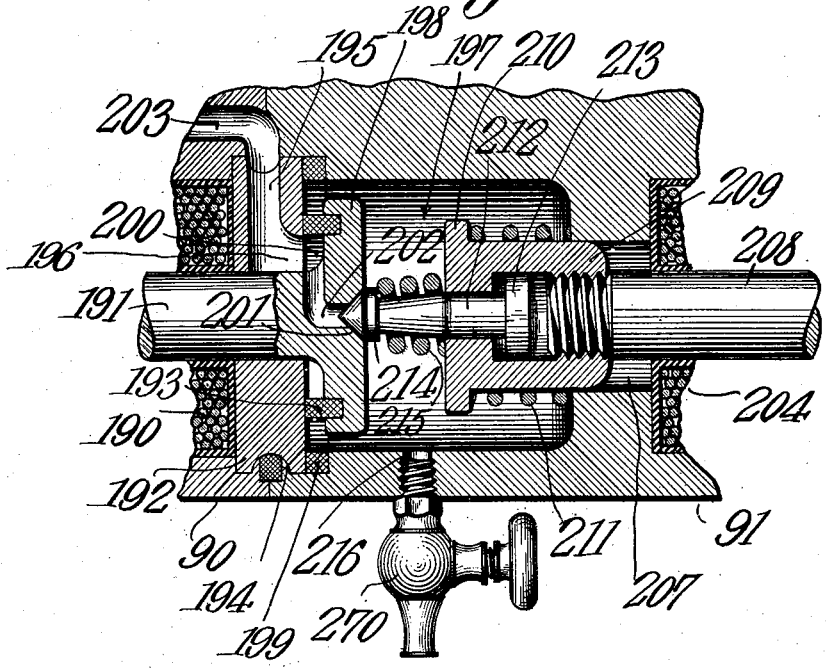
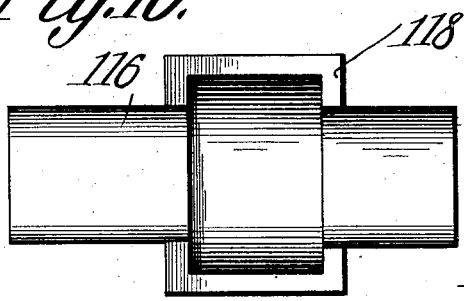
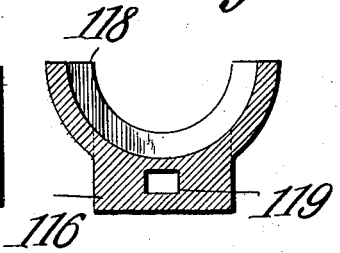
Witnesses
Inventor
William C. Mayo.

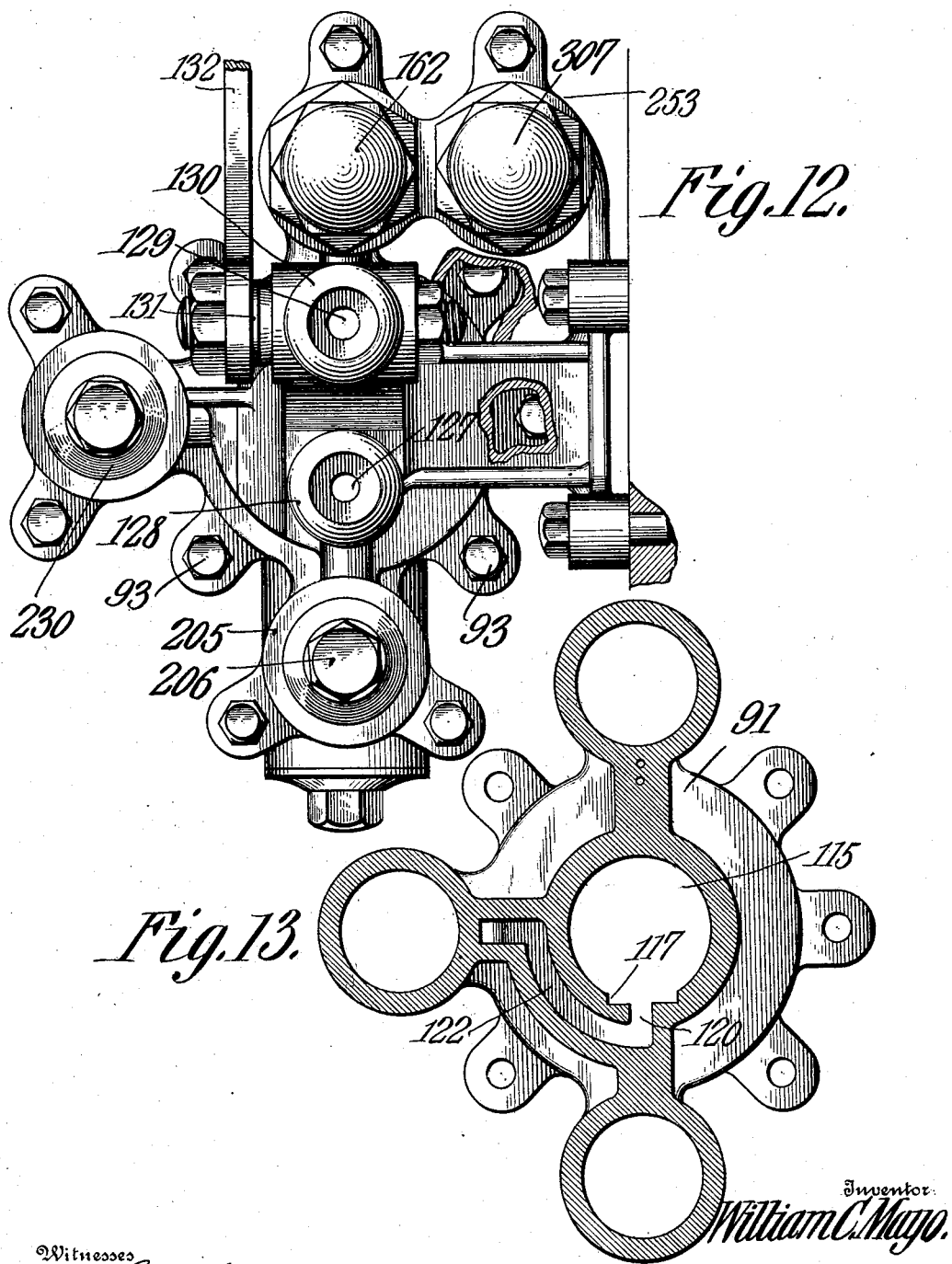

No. 897,218. PATENTED AUG. 25, 1908.
W. C. MAYO.
ELECTRICALLY OPERATED AIR BRAKE SYSTEM.
APPLICATION FILED NOV. 22, 1907.

8 SHEETS—SHEET 8.

Witnesses
E. F. Stewart
F. T. Chapman

Inventor
William C. Mayo.
By C. A. Snow & Co
Attorneys

UNITED STATES PATENT OFFICE.

WILLIAM C. MAYO, OF EL PASO, TEXAS, ASSIGNOR OF ONE-THIRD TO GEORGE E. BRIGGS, OF BARSTOW, TEXAS, AND ONE-THIRD TO WILLIAM C. MAYO AND ONE-THIRD TO JOHN HOULEHAN, OF EL PASO, TEXAS.

ELECTRICALLY-OPERATED AIR-BRAKE SYSTEM.

No. 897,218.            Specification of Letters Patent.            Patented Aug. 25, 1908.

Application filed November 22, 1907. Serial No. 403,361.

*To all whom it may concern:*

Be it known that I, WILLIAM C. MAYO, a citizen of the United States, residing at El Paso, in the county of El Paso and State of Texas, have invented a new and useful Electrically - Operated Air - Brake System, of which the following is a specification.

This invention has reference to improvements in electrically operated air brake systems and it comprises both a means for insuring a constant supply of compressed air and also an electrically operated triple for the control of the air to operate the brakes.

While the present invention is of general applicability and may be used on either steam or electric roads, it is designed more particularly as a part of a gasolene - motor traction system wherein each car is a unit, and the cars may therefore be used severally, or collectively in the form of a train.

For the better understanding of the present invention, it is deemed best to briefly consider the ordinary air brake systems in common use. In the ordinary system, the usual pressures are seventy pounds per square inch for the train pipe and ninety pounds per square inch for the main reservoir pressure. This gives an excess of twenty pounds pressure for recharging the auxiliaries under each car after a brake application, that is, this excess pressure first places the triple piston in "release" quickly, and then the auxiliaries are charged.

The auxiliaries having been charged up to seventy pounds, first consider a light "service" brake reduction of, say, seven pounds. In such a case, the train pipe pressure is reduced to sixty-three pounds, thus no longer balancing the triple piston with seventy pounds on the auxiliary side. The triple piston, therefore, moves to the service position under a pressure of seven pounds, neglecting friction which amounts to but a few ounces. The movement of the triple piston and its attendant graduating valve opens a port which allows the auxiliary reservoir to exhaust into the brake cylinder. When, however, the auxiliary pressure is reduced to sixty-three pounds, the triple piston will stop its movement while holding the port open to the brake cylinder. The auxiliary pressure then further falls by continuing the exhaust into the brake cylinder until it is below sixty-three pounds, and then the train pipe pressure, though only sixty-three pounds, will move the triple piston back so as to lap the port from the auxiliary reservoir to the brake cylinder by the closing of the graduating valve. In this position, all other ports are also lapped or closed. Under these circumstances, there is now, say, a little over sixty-two pounds pressure in the auxiliary.

If the main reservoir contained only the train pressure of seventy pounds and not the full pressure of ninety pounds, then when the train pipe is connected to the main reservoir to recharge the "train line," it is evident that to establish seventy pounds pressure throughout the train more than seventy pounds must be in the main reservoir, since very little air flowing from the main reservoir will cause a reduction in its pressure, and this reduction is, in practice, faster, depending on the length of the train, than the pump can replace, and the train line would equalize with the main reservoir pressure to a point somewhere below seventy pounds. Now, since under the conditions assumed, the auxiliary is still sixty-two pounds, then in a long train the train pipe pressure may equalize with the main reservoir pressure at or below the auxiliary pressure, and hence the triple piston will not be driven back except slowly as the pump brings up the pressure. Hence, the brakes will come off slowly or not at all, and the triple will remain lapped until the pump has raised the pressure sufficiently, and the train is brought to a standstill until this is accomplished. To overcome this difficulty is the reason for the twenty pounds excess pressure in the main reservoir. Now, while twenty pounds excess pressure is usually sufficient, since a service application or the sum of the respective reductions of more than one service application is always less than twenty pounds, because twenty pounds train pipe reduction will place the triples in "emergency," still this is not always the case, although, of course, after recharging the train pipe, the main reservoir pressure is again brought up by the pump to ninety pounds.

In steam railway practice, where the stops are infrequent, the pump, even with a long train, has usually plenty of time to restore the main reservoir pressure, but in systems where the stops are frequent, it is necessary to make other provision.

The general system of which the present invention is a part is designed for city, suburban and interstate traffic, and provision must therefore be made for frequent stops or applications of the brakes, as well as for the application of brakes at longer intervals. Now, air brakes are used on city cars or trains, but this means that the pumps, then electrically driven, are cutting in and out at nearly every stop, because the excess pressure used is only the commonly employed twenty pounds excess, which answers very well for the infrequent brake applications of steam railways. In city trains, this small excess of pressure means excessive wear on the pump equipment, which in practice is generally the case, or excessive size of main reservoir.

Now, it is the object of one portion of my invention to obviate the objectionable features due to the use of the ordinary air brake equipments on cars or trains where the stops are frequent, and this part of my invention comprises means whereby I am enabled to produce and maintain a much higher main reservoir pressure and consequently a smaller main reservoir, and also produce less wear on the pump, since, after the pump has established a high main reservoir pressure, it can remain out of action for some time before it must again come into service. I may state that generally I use one hundred and fifty pounds main reservoir pressure, but this pressure, though always high compared with the pressure ordinarily used, may be varied in accordance with the conditions to be met. Of course there would be greater leakage with one hundred and fifty pounds main reservoir pressure if used with the apparatus commonly employed with the main reservoir on the locomotive or leading car, and hose connections between the cars. This I obviate by placing a main reservoir under each car, thus doing away with the heavy and expensive hose connections which would be necessary in the ordinary system. Again, the heavier pressure means a stronger pump, but this adds but little to the cost of the pump, since it requires little, if any, more machine work on the pump, but only more metal to withstand the heavier pressure.

The triple valve referred to is what is known as the simple triple, and the operation described is known as "automatic air." There is, however, in use an improved triple known as the "quick action triple," which is identical with the ordinary triple in all its operations, except in the matter of the emergency application. The simple triple does not set the brakes at emergency harder than a full service application, but it sets them quicker. Also, under all circumstances, no air is used except that from the auxiliary reservoir for the brake cylinder to set the brakes, and all reductions of train pipe pressure are made at the engine-man's station by the usual valve there located. This is true in respect to the quick action triple in service applications. However, when an emergency reduction of train pipe pressure of twenty pounds or more is made, the reduction is effected first near the engineman's valve in the locomotive, or head motor car. As the quick action triple on the head car goes into emergency, it opens a valve admitting train pipe pressure into the brake cylinder first and then auxiliary pressure. This causes a local reduction of train pipe pressure regardless of the engineman's valve. This, of course, throws the quick action triple on the next car into emergency, which, in turn, sets that of the third car, and so on, so that the quick action triple not only sets the brakes quicker in emergency than in the service application, but, unlike the simple triple, it sets them harder. There is still another equipment known as the high speed brake, but it need not be here considered.

Quick action triples are used on high speed trains because they not only set the brakes quicker and harder and more nearly together than the simple triple, but if the engineman makes a reduction of pressure sufficient to set the first quick action triple to emergency, the whole train will go into emergency, even though the initial reduction be but twenty pounds. Now, even though it is against the engineman's instructions to use the emergency except in times of necessity, and then he must place his valve on emergency and let it stay there and must not lap on emergency, still orders and instructions are not always obeyed. Now, if the engineman makes an emergency application, and then laps his valve quickly on the simple triple, then, if the train pipe be a long one, the rear cars will not feel the application until after an appreciable time, and the air once started in a long train will, is most cases, by its surge to the front of the train, kick off the head brakes. Thus the head brakes first go on and the rear cars run ahead and the train "bunches," since the unbraked, or but slightly braked, rear cars take up the "slack" with heavy blows against the head cars. Then, as the application is felt on the rear cars, and, as sometimes happens, the brakes "kick" from the head cars, the slack travels toward the rear and the train "stretches." This, of course, is destructive to the rolling stock and to the contents of the cars. The quick acting brake does not cure this defect, since there is still some running ahead of the rear of train, for, even in the quick acting brake, there is a time element, though small, between the application of the brakes on the head and rear cars.

Now, it is the object of the second part of my invention to overcome these objectionable features, and I do this by providing an electric triple valve so constructed and operated as to simultaneously apply all the brakes equally and make any application of the brakes, regardless of the slowness and quickness of the engineman in making the application, practically instantaneous. This second part of my invention comprises certain instrumentalities by means of which this object is accomplished, and these instrumentalities, their structure and operation, will appear from the detailed description thereof which will follow in due course.

Figure 15:
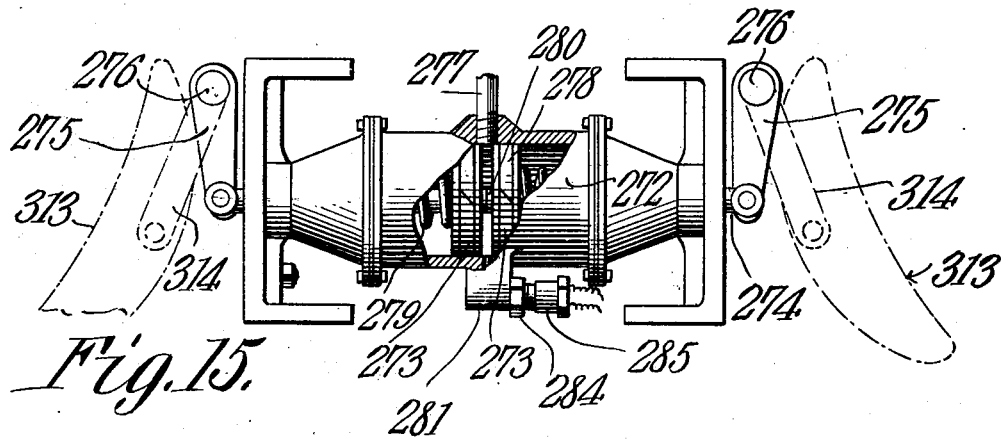

Having thus set forth the conditions giving rise to the present invention, I will now proceed to describe the invention in detail, having reference to the accompanying drawings forming part of this specification, and in which drawings, Figure 1 is a side elevation, with parts in section and other parts broken away, of the pump and governor used in my air brake system. Fig. 2 is an end elevation of the same structure, with parts in section and other parts broken away. Figs. 3 and 4 are sections, at right angles one to the other, of the governor mechanism. Fig. 5 is a longitudinal section through the electrically operated triple valve forming part of my invention. Fig. 6 is a cross section at right angles to the section of Fig. 5, with parts shown in elevation. Fig. 7 is a diagram of the electric circuit. Figs. 8, 9, 10 and 11 are views of portions of the triple valve on a larger scale. Fig. 12 is an end view of the casing of the triple with parts broken away. Fig. 13 is a section through the casing with parts removed from the interior thereof. Figs. 14 and 15 are views of the brake cylinder and parts coöperating therewith. Fig. 16 is a detail view of a portion of the crank-shaft of the pump.

Referring first to Figs. 1, 2, 3 and 4, there is shown a casting consisting of a base plate 1 from which rise two cylinders 2, 3 side by side, and the base plate may have formed on it a number of studs 4 projecting in a direction opposite to the direction of projection of the cylinders. These studs are formed with through openings 5 for the passage of bolts or screws 6 by means of which the structure is secured in place upon a suitable support.

The tops or outer ends of the cylinders have cast on them two series of brackets 7, there being three brackets on each side with the central brackets serving to connect or bind the free ends of the cylinders together. These brackets carry pedestals 8 cast in one piece with the connecting yoke 9, there being three castings composed each of two pedestals and the yoke 9. Each of the yokes 9 is suitably formed to constitute one-half of a journal bearing, the other half of which is in the form of a cap plate 10. However, in the structure shown in the drawings, the cap plate 10 is applied to the pedestal structure on the cylinder side thereof for a purpose which will presently appear. The pedestals are suitably recessed, as shown at 11, to receive bolts or screws 12 securing the said pedestals to the brackets 7. The bearings formed by the yokes 9 and cap plate 10 receive a crank shaft 13 having cranks 14 diametrically disposed, and these cranks each receive a pitman 15 by means of the usual journal bearings.

Within the cylinder there is a piston 16 of the usual trunk type provided with a suitable number of packing rings 17. The piston has diametrically disposed lugs 18 constituting supports for a pin 19 passing through a journal bearing in the corresponding end of the pitman 15 of the respective piston.

The two cylinders, with their pistons and pitmen and the crank shaft, constitute a simple type of duplex acting pump, in this case an air pump, and the parts are designed both in size and speed of operation to supply air as needed up to and to maintain within a suitable reservoir a pressure of one hundred and fifty pounds per square inch. Since the inlet and outlet ports and valves of the pump are, or may be, of ordinary construction, only the exterior thereof is shown in the drawings at 20 and 21, respectively, the inlet valve structure 20 being provided with a screened induction opening 22, and the outlet valve structure communicates with a pipe or conduit 23 which is assumed to lead to a suitable reservoir, the latter, however, not being shown in the drawings, it being of the type usually employed in air brake systems.

The crank shaft 13 is extended at one end beyond its bearings and there has keyed to it a gear wheel 24, which gear wheel is in mesh with a gear pinion 25 on a shaft 26, which shaft may be the power shaft of a suitable prime mover, such, for instance, as the explosive engine heretofore referred to. The pinion 25 is mounted to turn freely upon the shaft 26 and for this purpose is provided with a bushing 27 of bronze or Babbitt metal, or other suitable material. Now, in order to prevent the pinion from moving longitudinally of the shaft 26, the gear teeth of the wheel 24 and pinion 25 are made of the herring-bone type, which type of gear teeth also provides a smooth running intermesh between the gear and pinion.

On one side of the pinion 25 is formed a hub 28 terminating in an annular series of teeth 29 having inclined faces and an abrupt shoulder with the junction point between the inclined face of one tooth and the base of the preceding tooth formed with a notch or depression 30. The hub 28 with the teeth 29 constitutes one member of a clutch couple, the other member of which is formed of a similar hub 31 having teeth 32 with notches 33 like the notches 30, and this hub 31 is formed on a collar 34 mounted on the shaft 26, but secured thereto for rotation therewith by a spline or key 35, although this collar, with its hub 31, is capable of longitudinal movement on said shaft 26. The collar 34 has a central peripheral groove 36 the sides of which converge toward the axis of the shaft. Within the groove 36 are two frusto-conical rollers 37 disposed on diametrically opposite sides of the axis of the collar and carried at the ends of a fork 38 formed on the end of the lever arm 39. The free ends of the fork 38 are each formed into a boss 40 in which latter there is secured a pin 41 projecting radially inward and constituting a journal support for the respective roller 37. The converging walls of the groove 36 coact with the frusto-conical periphery of each roller 37 to maintain the latter upon its journal pin 41, so no special fastening means is required for this purpose.

Fast upon the base plate 1, or to a suitable extension thereof is a bracket 42 terminating in a circular head 43 from one face of which there projects an annular flange 44 and a central stud 45. On the opposite side of the head 43 from that containing the flange 44 and stud 45 there is formed a cylinder 46 extending diametrically across the head 43.

Secured to the head 43 by means of stud bolts 47, or otherwise, is a casing 48 having a flange for the reception of the bolts 47. This casing is of sufficient internal diameter at one end to receive the annular flange 44, and this portion of the casing terminates in a shoulder 49 between which and the end of the flange 44 there is confined a diaphragm 50 preferably of rubber but which may be made of any other suitable material. Beyond the shoulder 49, which is an annular shoulder, the casing 48 is of less internal diameter, and this portion of the casing terminates in another annular shoulder 51 forming a seat for a bearing ring 52 of brass or bronze, or other suitable material. Beyond the shoulder 51, the casing may be tapered, as shown, or be otherwise shaped, and terminates in a head 53 through which is a central perforation for the passage of a piston rod 54. On the exterior of the casing there is formed a bracket 55 terminating in ears 56 between which engage bosses 57 formed on opposite sides of the lever 39. This lever is pivotally supported between the ears 56 by a pivot pin 58 having one end of polygonal shape, as shown at 59, and the other end reduced and threaded, as shown at 60, to be seated in a nut formed in one of the ears 56. The structure just described with reference to the pin 58 is shown in connection with the piston rod 54, as illustrated in Fig. 4, where it will be seen that the piston rod terminates in two ears 61 like the ears 56, and the relation of the pin 58 to these ears is here most clearly shown. It will be understood that wherever the structure as a whole calls for the use of pivot pins, such pivot pins are preferred. On that end of the piston rod 54 within the casing 48 there is secured a piston 62 by shouldering and tapering the end of the piston rod and inserting it in a tapered seat in the piston and there securing it by means of a screw 63 the head of which is countersunk into the further face of the piston. The diameter of the piston is such that it will slide freely, yet snugly, in the bearing ring 52, and this bearing ring is made removable so that when worn it may be replaced. Within the casing 48, between the head 53 and the piston 62, the piston rod is surrounded by a spring 64 tending to urge the piston 62 against the diaphragm 50 and the latter into engagement with the stud 45, the edges of which are slightly rounded to avoid cutting this diaphragm.

The tendency of the spring 64 is to move the lever 39 in a direction to cause the fork 38 to travel toward the left, as viewed in Fig. 1, and a force acting upon the diaphragm 50, in opposition to the spring 64, will tend to move the fork 38 toward the right as viewed in Fig. 1. When either of these forces is exerted, the collar 34 constituting one member of the clutch couple, participates in the movements caused by these forces. The parts are so designed that the movement of the piston rod 54 in either direction is sufficient to cause the engagement or disengagement of the teeth 29 and 32, so that, assuming that the spring 64 is active, then the clutch members are engaged and power is transmitted from the shaft 26 through the clutch to the pinion 25, and from thence to the gear wheel 24 and the pump pistons are then set in motion. When by a force applied to the diaphragm 50 in opposition to the spring 64, the latter is overpowered, then the clutch members are disengaged and, power no longer being transmitted to the pump pistons, the latter are stopped.

Within the cylinder 46, there is a piston 65 provided with a suitable packing ring 66. This piston is fast upon a piston rod 67 near one end thereof. The piston rod beyond the piston is formed with an annular enlargement or head 68 having the face remote from the piston shaped to engage a flat valve seat, as will presently appear. In line with the cylinder 46, that is central with the bore thereof there is formed through the bracket 42 a conduit or passageway 69 and, at the point of connection of this passageway 69 with the interior of the cylinder, this passageway is counter-bored, as shown at 70, to receive a stem 71 projecting from the flat face of the head 68 as a continuation of the piston rod 67. Surrounding the bore of the cylinder 46 at the end entered by the conduit 69 is an annular groove 72 into which is sprung a rubber or similar washer 73 with a central orifice somewhat larger than the diameter of the stem 71, and counterbore 70. This washer 73 when sprung into the annular groove 72 will remain therein against accidental displacement, and this washer constitutes a seat for the head 68, which latter, as will presently appear, performs the function of a valve.

The cylinder 46 has the end remote from the conduit 69 formed open, and this open end is closed by a screw plug 74 formed with a hexagonal nut 75 for the application of a wrench and with a flange 76 between which and the end walls of the cylinder is introduced packing 77. The plug 74 has a central bore 78 extending for a distance into its body from the inner end to receive the corresponding end of the piston rod 67, this end of the piston rod being formed conical to constitute a valve 79, and the inner end of the bore 78 is shaped to form a seat for the valve 79. Leading from the inner end of the bore 78 is a passageway 80 terminating and opening at the side of the plug into an annular groove surrounding the plug 74, and also leading from the bore 78 at a point above the valve seat is another passage 81 opening into the cylinder at the inner end of the plug. Leading from the annular groove into which opens the passageway 80 at the side of the plug is another passage or conduit 82 in the head 43, which passageway leads to and through the stud 45, and terminates at the center thereof where it opens into the chamber 83 formed between the inner face of the head 43 and the diaphragm 50 and circumscribed by the flange 44. This chamber is also in communication with the interior of the cylinder 46 above the piston 65 by way of a port 84.

Between the piston 65 and the plug 74 the piston rod 67 is surrounded by a helical spring 85, and that portion of the interior of the cylinder 46 housing this spring 85 is in communication with the external air through a permanent port 86. The bracket 42 is brought into direct metallic contact with the base 1, or the extension therefrom, to insure a firm seat, and the conduit or passage 69 is then in coincidence with another passage 87 in communication through the base 1 or extension thereof with the conduit 23 leading to the reservoir. Now, in order to insure an air tight joint, the bracket is counterbored around the conduit 69, and, if need be, the base 1 is counterbored around the passage 87, so as to receive a soft rubber washer 88 having a central passage normally of greater diameter than the diameter of the passages 69 and 87, and the normal thickness of this washer is greater than the depth of the countersink in the bracket 42, or the combined depth of the countersinks in the meeting faces of the bracket 42 and base 1 when both are countersunk. The diameter of the washer is such as to snugly fit these countersinks. Now, when the bracket 42 and base 1 are brought together, the rubber washer 88 is compressed because it is of greater thickness than the depths of the countersinks, and therefore when compressed it must expand in the direction of least resistance, which is toward the central perforation since the walls of the countersinks prevent this washer from expanding outwardly. The central perforation of the washer is, however, made larger than the diameter of the passageway 69 or 87, so that when the washer is compressed, the reduction in diameter of the central perforation, due to the compression of the washer, is insufficient to throttle either passage. Such a packing will most effectually resist internal pressure, while permitting adjoining structures to be brought into direct metallic contact. A similar packing to the one just described is introduced between the casing 62 and the head 43, as indicated at 89, while the packing 77, before referred to, may be similar to the packing 88.

It is to be understood that throughout the structure forming the subject matter of the present invention, I prefer to use packing in the manner set forth in the reference to packing 88 wherever internal pressure will act upon such packing, and such a structure is feasible.

Now, let it be assumed that there is no air pressure, above atmospheric pressure, in the reservoir. Under these conditions, the spring 85 holds the valve 68 firmly against the seat 73 with the valve end 79 away from its seat in the plug 74. The spring 64 holds the piston 62 with the diaphragm 50 in firm engagement with the face of the stud 45. Under these conditions, the passageway 69 is closed by the valve 68, and the passageway 82 is closed by the diaphragm, but this passageway 82 is open to the external air through the passages 80 and 81 and the port 86. With the parts in the position assumed, the clutch members are in engagement and consequently the pumps are at work. Incidentally, the stud 45 acts as a stop for the piston rod 54 and, consequently, limits the movement of the clutch members toward each other, preventing the teeth from pressing with undue force upon each other.

For the purposes of this description, let it be assumed that the area of the piston 65 is one square inch and that the spring 85 exerts a pressure of ninety pounds, then, this spring will yield when the pressure upon the other side of the piston 65 exceeds ninety pounds. As has already been stated, the reservoir pressure to be maintained is one hundred and fifty pounds per square inch, therefore, the end 71 of the piston rod 67, which end 71 is seated in the counterbore 70 of the passage 69 in constant communication with the reservoir, must have an area so much smaller than a square inch as the reservoir pressure is proportionately larger than the power of the spring 85. So, under the conditions assumed, an end area of three-fifths of a square inch of the stem 71 will cause a reservoir pressure of one hundred and fifty pounds to the square inch to balance the spring 85. Now, a slight increase of reservoir pressure will force back the piston rod and open the valve 68, so that air escapes into the cylinder 46 above the piston 65, and also reaches the chamber 83 through the port 84. Now, since the valve 68 is opening under a pressure of one hundred and fifty pounds per square inch, it will be seen that the upper end of the cylinder and the chamber 83 are almost instantly filled. As soon as the pressure has reached ninety pounds above the piston 65, the latter is moved against the tension of the spring 85, and the valve 68 is opened wide, so that with a full pressure of one hundred and fifty pounds, there is an excess of sixty pounds acting on the piston 68. This results in the immediate closure of the valve 79. But, in the meantime, pressure has been accumulating in the chamber 83 which is in constant communication with the upper end of the cylinder 46 through the port 84, and this pressure is being exerted upon the diaphragm 50 and through it upon the piston 62. This pressure, however, is resisted by the spring 64 which is adjusted to resist an air pressure of eighty pounds per square inch before yielding. Now, let it be assumed for the purposes of the present description that the area of the piston 62 is one square inch, then the spring 64 presents an absolute resisting force of eighty pounds. But since the diaphragm 50 is in contact with the stud 45, then the effective area under the influence of the accumulating pressure in the chamber 83 is reduced by an amount equal to the area of the face of the stud 45. Let it be supposed that the face of the stud covers two-ninths of a square inch, then the effective area of the active end of the piston 62 is but seven-ninths of a square inch, so that when the pressure in the chamber 83 is ninety pounds per square inch, then there is an absolute pressure upon the piston 62 in opposition to the spring 64 of but seventy pounds. Consequently, when there has accumulated above the piston 65 a pressure sufficient to overcome the spring 85, the force of the spring 64 is still sufficient to maintain the diaphragm against the face of the stud 45, and it is not until the pressure in the chamber 83 exceeds one hundred pounds per square inch, say, one hundred and three to one hundred and four pounds per square inch, that the pressure upon the effective area of the piston 62 through the diaphragm 50 is sufficient to overcome the absolute pressure of the spring 64, and thus cause the piston and diaphragm to move away from the stud 45. But as soon as the piston moves away from and so uncovers the face of the stud 45, the full area of the piston at once becomes effective, and, under the assumption that the area of this piston is one square inch, then the spring 64 is opposed by a pressure of, say, one hundred and three pounds, or twenty-three pounds in excess of its power, and this pressure is constantly increasing up to one hundred and fifty pounds, or seventy pounds in excess of the spring. This results in a quick movement of the piston to disengage the clutch coupling the power shaft to the pump. However, the more sluggish action of the piston 62 has given time for the movement of the piston 65 against the action of the spring 85, and the valve 79 has become seated in the plug 74, so that the passages 80 and 82 are closed to the external air. Since the spring 64 has a force of eighty pounds, the pump will remain inactive so long as the pressure in the chamber 83 exceeds eighty pounds.

Now, let it be assumed that the air in the reservoir has been used for braking purposes, and for other purposes in the system of which the present invention is a part until the air pressure in the reservoir is reduced to ninety pounds. Under these conditions, there is still ten pounds excess pressure against the spring 64, thereby keeping the pump cut out, while the piston 65 is ready to move under the action of the spring 85, because the air pressure and spring pressure are now balanced. Suppose, now, that the air pressure is again reduced to slightly below ninety pounds. The spring 85 tends now to close the valve 68, and the parts are so adjusted that the valve 68 is nearly closed by the time the valve 79 opens to permit air to escape from the passage 80 through the passage 81 and out through the port 86. Under these conditions, that portion of the cylinder 46 above the piston 65 and also the chamber 83 are both in communication with the external air through the passages 80, 81 and 82 and port 86. Now, the passages 80, 81 and 82 and the port 86 are comparatively large, so that the air exhausts rapidly, while little escapes by the valve 68, since this last-named valve is very nearly closed and the exhaust passages for the air are so large that the pressure falls rapidly in the upper end of the cylinder 46 and in the chamber 43, in spite of the fact that air from the main reservoir is escaping by the valve 68. The decreased pressure above the piston 65, together with an accumulation of pressure on the spring side of the piston, because the port 86 is made slightly smaller in area than the passages 80, 81 and 82, will accelerate movement of the piston under the impulse of the spring 85. The parts may be so proportioned that the exhaust through the port 86 will be slow enough to permit the pressures on opposite sides of the piston 65 to reach nearly the same values, and the piston is therefore under practically the full action of the spring 85. Furthermore, it takes less pressure to continue the motion of the piston than to start it. It will thus be seen that movement of the piston 65 to closed position is practically instantaneous.

The capacity of the cylinder 46 above the piston 65, and also the capacity of the chamber 83, is small, therefore, the opening of the valve 68 is also small, and since the pressure of the spring 85 will somewhat compress the packing or gasket 73 when the valve 79 is fully open, the resiliency of this rubber gasket 73 will cause it to slightly expand and follow up the valve 68 for a short distance before the said valve actually leaves it when moving against the action of the spring 85. Since, in any event, the travel of the valve is very short, the expansion of the rubber gasket will be such that the valve 68 will close with the valve 79 but partly open, and the compression of the gasket 73 will then permit the full opening of the valve 79. Now, as the piston 65 starts to close the valve 68, when the pressure in the reservoir is but a fraction below ninety pounds per square inch, and as the pressure in the chamber 83 must be reduced to eighty pounds per square inch before the piston 52 will move under the impulse of the spring 64, and, since the valve 68 closes almost instantly, it follows, therefore, that the valve 68 will be tightly closed before the air pressure in the chamber 83 is reduced to eighty pounds per square inch. Now, an air pressure reduction of three or four pounds below ninety pounds will cause the certain closure of the valve 68, so that there must still be a reduction in pressure of five or six pounds more through the exhaust port 86 before the piston 62 will move. As soon as the valve 68 becomes seated, the back pressure from the reservoir is exerted only on the end of the stem 71, and as this stem is only about three-fifths the area of the piston 65, the spring 85 overbalances the reservoir pressure at a ratio of five to three, thus firmly seating the valve 68 quickly and surely without chatter. In the meantime the air pressure in the chamber 83 is reduced by the escape of air to the port 86 and the spring 64 becomes active to move the piston 62 until the diaphragm 50 is seated on the stud 45 and the pumps are put into action and will remain in action until the reservoir pressure reaches one hundred and fifty pounds, when the resistance of the spring 85 is overcome and the operations described are repeated.

It will be apparent from the foregoing that the governor is quick acting with a large effective pressure to hold the clutch in engagement and with a large force for disengaging the clutch. The clutch is held in its active position by the force of the spring 64 which is eighty pounds, and is moved out of engagement by the reservoir pressure of one hundred and fifty pounds from which must be taken the eighty pounds pressure necessary to compress the spring 64, thus leaving an effective pressure of seventy pounds to disengage the clutch. Thus the movements of the governor are quick and positive, preventing broken or injured teeth at the clutch, and this latter contingency is further avoided by the recesses 30 and 33, at the bases of the teeth.

It is quite evident with the style of clutch illustrated, seventy or eighty pounds pressure would not be needed, or, at any rate, not more pressure would be needed. The governor is therefore made quite small, and may be materially smaller in proportion than shown in the drawings.

The movement of the rubber diaphragm 50 is necessarily limited and the stroke of the piston 62 is correspondingly very short. Now, if the movement of the clutch members toward and from each other is considerable, then the ratio between the two arms of the lever 38 must be correspondingly large, and the governor must be proportioned to meet the conditions present. Of course, the inclusion in this application of the toothed clutch does not preclude the use of a friction clutch of any suitable type.

Referring now to Figs. 5 to 13, both inclusive, there is shown an electric triple designed to operate on the straight air system primarily, but including means whereby the triple may be adapted to the automatic air system, so that the controlling power may be coupled up with cars equipped with the straight air system of brakes, or with cars equipped with brakes operated on the automatic air system, or with both. The casting of the triple is made in two parts, 90, 91, for convenience of manufacture and accessibility of the interior of the casting for machining the parts and for the assembling of the structure. These two castings are provided with matching ears 92 through which pass bolts or screws 93 for securing the two parts together. The meeting parts of the two castings 90 and 91 are provided with packing rings 94 similar to the packing rings 88 and 89 described with reference to Fig. 4. In fact, wherever packing is required between fixed metal surfaces in the triple valve, such packing will be used, but this does not preclude the use of ordinary packing rings in the manner commonly employed. Within the casting 90 there is formed a cylinder or cylindrical chamber 95 one end of which is closed by the other portion 91 of the casing. In the cylinder 95 there is a short trunk piston 96 shown in section in Fig. 5 and in elevation in Fig. 6. The piston 96 is provided with one or more packing rings 97 of suitable type, but one being shown in the drawing. The periphery of the piston is turned down about midway of the length of the piston to form two bearing portions 98 and 99, the bearing portion 98 carrying the packing 97.

The piston is provided with a hub 100 suitably tapped to receive the threaded end of a stout tube 101 open at each end but closed near the center by a diaphragm 102 which may be made integral with the tube. This tube is thereby divided into two cylindrical chambers 103 and 104, the chamber 104 being slightly greater in diameter than the chamber 103. Within the chamber 103 is a helical spring 105 of sufficient strength for a purpose which will hereinafter appear. Extending through the centrally bored and true hole in the piston 96 is a plain headed pin 106 engaged by and forced outwardly by the spring 105. This pin fits snugly in the hole in the piston, but at the same time is free to be moved to put the spring 105 under compression, which happens when the piston is moved into the cylinder 95 to a sufficient extent to bring the free end of the pin 106 into contact with the back wall 107 of the cylinder 95. Contained within the other chamber 104 is a graduating valve 108 which slips snugly but freely through a screw plug 109 entering the open end of and thereby closing the chamber 104. The graduating valve has its rear end formed with an integral annular flange 110 snugly but freely fitting the interior of the cylindrical chamber 104. This flange also prevents the valve 108 from being withdrawn from the chamber 104 by engaging the bushing or screw plug 109, which thereby acts as a stop for this valve 108. Furthermore, the bushing 109 and the flange 110 coact to guide the valve 108, thus insuring a true traverse of the said valve 108 within the chamber 104. The valve 108 has a central longitudinal bore 111 extending from its rear end to near the front end, and housed in this bore is a spring 112 abutting at one end against the inner end wall of the bore and at the other end against the diaphragm 102. The tendency of this spring is to constantly project the valve 108 out of the chamber 104. The outer end of the valve 108 is formed with a head 113 of conical shape acting, during a limited and predetermined travel of the piston 96 toward the wall 107 of the cylinder 95, to maintain the service port 114 closed.

Opening into and concentric with the cylinder 95 is another cylinder 115 formed in the casing 91. This cylinder 115 is somewhat longer and is of less diameter than the cylinder 95. The chamber 104 and valve 108 and parts coacting therewith is contained within the cylinder 115, which cylinder in one cycle of operations, together with that part of the cylinder 95 on the corresponding part of the piston 96 constitute the auxiliary reservoir pressure chamber. This cylinder or chamber 115 and the coacting part of the cylinder 95 connects to the auxiliary reservoir through the boss 130 when the triple is worked as "automatic air". While the portion of the cylinder 95 between the piston and the wall 107, under the same conditions, constitutes the train pipe pressure chamber. Under the second cycle of operation, that is, when the triple is arranged for "straight air", that portion of the cylinder 95 between the piston 96 and the wall 107 then becomes the main reservoir pressure chamber, while the cylinder 115 and coacting part of the cylinder 95 become the brake cylinder pressure chamber.

The head of the bushing 109 is greater in diameter than the tube 101, and this projecting portion of the bushing 109 engages the emergency slide valve 116. This slide valve 116 is a rectangular member with a flat base, and the cylinder or chamber 115 has a straight rectangular groove 117 cut throughout its length to receive the valve 116. The upper side of the valve 116 is made concave on an arc of slightly greater radius than the inclined circle of the tube 101. In the center of the valve 116 there is formed a cylindrical segment 118 on a curve slightly greater than the curve of the head of the bushing 109, and the inside length of this segment 118 is as much greater than the thickness of the head of the said bushing 109 (say approximately three times) as is needed for the purpose of the valve, as will appear in due course. The head of the bushing 109 is thus so related to the valve that it may have a limited movement and then carries the valve with it.

Cast in the valve 116 is a conduit 119 ending in two machined ports either square or rectangular. For clearness of illustration, the ports are indicated in Fig. 6 as square, but, in practice, rectangular ports of narrow width are preferred. These ports exactly match similar ports 120 and 121, machined or otherwise produced in the bottom of the groove 117 and in the central line thereof. The port 120 opens into a conduit 122 which leads to a chamber 123 (see Fig. 6) in the slow release cylinder 124, to be hereinafter described. As will appear further on, this conduit 122 constitutes the brake cylinder exhaust. The port 121 opens into a conduit 125 which connects with the service conduit 126 leading to the port 114 and also opening into another conduit 127, which latter leads into a threaded boss 128 for receiving a pipe leading to the brake cylinder or cylinders, as the case may be.

The cylinder or chamber 115 is connected by a conduit 129 opening ultimately into a threaded boss 130 for receiving a pipe leading to the auxiliary reservoir. Interposed in the conduit 129 is a valve 131 so arranged that it may close the conduit 129, thus destroying the connection between the chamber 115 and the auxiliary air reservoir. As shown in Fig. 5, however, the parts are in position for the triple to operate with automatic air, as will hereinafter appear. The exterior view of this valve 131 is shown in Fig. 12, where it will be seen that it is provided with an operating lever 132.

In Fig. 5 the triple is shown in the release position. In this position the feed groove 133 places the cylinders 95 and 115 in communication one with the other, but only at this position and no other. The feed groove 133 is cut into the walls of the cylinder 95 and is of sufficient area to charge up the auxiliary reservoir and chamber 115 to full train pipe pressure in about twenty seconds.

Now, in the air brake equipments in common use, the feed grooves in the triples are generally adjusted to charge up the auxiliaries in seventy seconds. When the engineman places his valve on "release", and thus admits main reservoir pressure to release the brakes, (considering the usual air brake systems) the triple piston is driven to the release position by the train pressure which has been restored to the regular pressure of seventy pounds by the main reservoir. The feed groove in the triple is thus uncovered and the depleted auxiliary pressure, lowered by the air used in the brake cylinder, is gradually brought to train pipe pressure through the said feed groove. In the meantime, the main reservoir pressure is kept up to or near ninety pounds by the pump.

Now, it is evidently advantageous to charge up the auxiliaries as soon as possible, since a brake application may be needed at any time and the low auxiliary pressure will result in less braking effect if the application is emergency, or a greater train pipe reduction if the application is a service one. For instance, a full emergency application will give only a service application of more or less pressure at the brake shoes because of low auxiliary pressure, especially if a heavy service application immediately precedes the emergency application. If, again, the feed grooves be made large, then the main reservoir pressure is drawn into the train pipe faster than the pump can furnish air, so that if a brake application is then made there would be insufficient pressure to release with, and the engineman would have to lap his valve and wait for the pump to bring up the main reservoir pressure.

With the system forming the subject-matter of the present application, the feed groove may be made as large as desired, since there are sixty pounds excess pressure though it is applied as usual. I therefore arrange the feed grooves to charge up the auxiliaries in twenty seconds, which is more than three times as fast as in the ordinary brakes, and will, probably, meet all practical requirements, but if, in practice, it becomes desirable to increase the speed of recharging, this may safely be done without bringing about the troubles mentioned. The feed groove 133 may be placed in communication with the cylinder or chamber 115 through a hole 134 drilled through the flange of the piston 96, or the feed groove may be continued directly into the chamber 115.

Now consider the piston 135, which piston has a peripheral groove 136. This piston is located in a chamber 137 and is normally urged toward one end thereof by a light helical spring 138 of sufficient tension only to keep the piston normally in the position shown in Fig. 5. Leading from the cylinder or chamber 137 is a short cylindrical passage 139 in which moves a slide valve 140 in a groove similar to the groove 117 above referred to. The passage 139 opens into a chamber 141 which is in direct communication with the threaded boss 142 into which is screwed a pipe leading from the regular slide valve feed valve, if one be used, which valve in turn is connected to the main reservoir. Such slide valve feed valve serves to reduce the pressure from the main reservoir of my system to a suitable pressure for use in mechanisms comprised in the system as a whole, but having nothing to do with the present invention, is not shown in the drawings.

Leading from the chamber 141 is a conduit 143 which ends at 144 where it is formed into a valve seat. Since this conduit is never used in connection with the automatic air system, it will not be further considered until the operation of the triple under the straight air conditions is set forth.

One end of the cylinder or chamber 137 is coincident with the edge of the casting 90 and is there counterbored to receive a disk 145 provided with a central hollow boss 146 into which projects a piston rod 147 fast on the piston 135. The other side of the disk 145 has an inwardly-extending pin which forms one pole of the solenoid 148. The hollow boss 146 acts as a guide for the piston 135, and the spring 138 finds an abutment against the disk 145. In the casting 91 in line with the chamber 137 there is formed a chamber for the reception of a solenoid 148, and a rubber or other similar packing ring 149 is here introduced to maintain the disk 145 in position and to prevent leakage or moisture from the compressed air, which always contains more or less water, into the solenoid, since a burn out might be thus caused, though the solenoid is well protected by insulation 150. The piston 135 has no packing, and, because of this and the groove 136, there is some leakage purposely allowed for between the chambers 137 and 141. The chamber containing the solenoid 148 terminates in an integral diaphragm 151 on the other side of which there is formed another chamber 152. Leading from the chamber 137 to the chamber 152 is a small conduit 153¹. The solenoid 148 has an armature 153 extending through the diaphragm 151 and entering the chamber 152 where it is provided with an end flange 154 between which and the diaphragm there is confined a light spiral spring 155. On the end of the armature 153 there is formed a valve 156 adapted to a valve seat 157 formed in a bushing 158 screwed centrally into one end of a cylinder 159 which, in turn, is screwed into the end of the chamber 152, as indicates. The outer end of the cylinder 159 is closed tight by a screw plug 160 formed with a polygonal head 161 for the application of a wrench, which head is protected by a cap 162 screwed onto the plug and operating as a lock nut. This construction also admits of proper regulation of the spring 169 and thereby the air pressure. Near the other end of the cylinder 159 there is formed an annular shoulder 163 against which is confined a rubber or elastic metallic diaphragm 164 by means of a locking ring 165. Guided within the interior of this locking ring is a head 166 bearing against the corresponding face of the diaphragm 164 and formed with a central pin extension 167 the free end of which enters a central recess 168 in the corresponding face of the plug 160. Surrounding the pin 167 between the head 166 and the plug 160 is a helical spring 169. The face of the annular shoulder 163 remote from that engaged by the diaphragm 164 is made tapering, and seated in this tapering shoulder face is a disk 170 formed with a central seat for a valve 171 having a stem extension 172 extending through the disk 170 into engagement with the diaphragm 164. On the other side of the valve 171 there is another valve stem 173 terminating in a slightly rounded head 174 entering a central bore 175 in the solenoid armature 153 and engaging a spring 176 housed in said bore.

As will hereinafter appear, the solenoid 148 is always energized except for service lap, and emergency applications. Consequently, except under the three conditions named, the spring 155 is compressed and the valve 156 is withdrawn from its seat in the bushing 158. The spring 169 is sufficiently heavy and strong to normally keep the diaphragm 164 in a position to open the valve 171, unless resisted by air in the chamber 152 of a certain pressure.

Now, let it be assumed that there is no air in the brake equipment and hence none in the triple. The heavy spring 169 keeps the valve 171 open. This spring exerts a pressure of seventy pounds on the diaphragm, if the latter has a surface of one square inch, and proportionately greater or less if the area of the diaphragm be greater or less than one square inch. Suppose that the main reservoir pressure, which may range anywhere from ninety to one hundred and fifty pounds, as before explained, enters the chamber 141. The piston 135 will be forced to move against the light spring 138, and the valve 140 participates in this movement. Normally this valve closes a port 177 and when the compressed air enters the chamber 141, this port is opened wide as the valve 140 moves with the piston 135. There is, however, a leak around the piston 135 into the chamber 137 and by conduit 153¹ into chamber 152, thence by the valve 156, the solenoid 148 being energized, thence by valve 171 through the valve seat in the disk 170 into the space between this disk and the diaphragm 164, the disk being spaced a short distance from said diaphragm. Now, this space between the disk 170 and diaphragm 164 is connected by a conduit 178 to the chamber or cylinder 95 adjacent to the wall 107. Therefore, the air which has leaked by the piston 135 ultimately finds its way into the cylinder 95.

The port 177 communicates with a conduit 179 which in the position of the parts shown in Fig. 5 is in communication with one branch 181 of the passages through a three-way valve 182 suitably mounted in the casing section 90. Another port 183 of this valve is in communication with a conduit 184 leading into the chamber or cylinder 95. Another port or passage-way 185 of this valve is in communication through a conduit 186 with a chamber 187 formed in the casing 90 and in communication with a boss 188 into which is screwed the train pipe. This chamber 187 constitutes a water drainage chamber and has an opening at its lower end normally closed by a screw plug 189. In the meantime, the air in quantity has been flowing through the port 177 and the conduit 179 to the valve 182 where a portion follows the conduit 184 into the cylinder or chamber 95, and the other portion flows through the conduit 186 into the drainage chamber 187, and ultimately into the drain pipe, which has a tee connection from which the train pipe extends to the two ends of the car (considering but one car) where the usual angle cocks and hose are connected on. Under the present conditions, it is assumed that both angle cocks are closed. It is to be understood that in my system, considered as an electric system, no hose connections are provided, but still I provide, or may provide, the regular hose connections in order that this triple constructed in accordance with my invention may work in the usual train systems in common use.

The pressure rises rapidly in the several conduits and chambers named. As soon as the pressure reaches seventy pounds, the pressure in the space in front of the diaphragm 164 balances the tension of the spring 169, and the diaphragm moving against this spring the valve 171 follows under the impulse of the spring 176 until this valve finally seats in the disk 170, thereby closing communication between the chamber 137 and the cylinder or chamber 95. Now, the air, which has been leaking by the piston 135, rapidly equalizes with the air in the chamber 141, and with equal pressure on each side of it, the piston 134 being free to move under the tension of spring 138 takes up the position shown in Fig. 5, where the port 177 is closed. This movement is prompt and air is now at seventy pounds pressure in the train pipe and cylinder 95. Now, let the pressure be reduced below seventy pounds. The spring 169 opens the valve 171, and the pressure in the chamber 137 is quickly reduced to the pressure in front of the diaphragm 164. The piston 135 then again opens the port 177 until the pressure again reaches seventy pounds in the chamber 95, thus seventy pounds pressure is constantly maintained.

The construction, both electrical and mechanical, of all the solenoids in the triple valve are identical, but the valves operated by them are somewhat different. Now, consider the emergency solenoid 190 and its armature 191. The solenoid 190 is housed in a suitable chamber formed in the casting section 90, and this chamber has its end coincident with the edge of the casting counterbored to receive a disk 192 which is packed and secured by a packing ring 199 similar to the manner of packing and securing the disk 145 already referred to. However, the disk 192 is thicker than the disk 145 and has formed in it a peripheral groove 194 of semicircular cross section of considerable size. This disk has a central passage for the armature 191, and drilled radially through the disk from the bottom of the groove 194 to the central hole is a passage 195 terminating in a port 196 leading to that face of the disk away from the solenoid. Formed in the casting section 91 in line with the solenoid 190 is a chamber 197, and within this chamber the armature 191 is expanded into a disk-like head 198 in which is formed an annular groove on the face contiguous to the disk 192 in which is seated a packing ring 193 projecting a distance from the face of the disk, so that when this packing ring is in engagement with the face of the disk, there is formed a small chamber 200 into which the port 196 leads. The outer face of the head 198 is formed with a central valve seat 201 which is in communication with the chamber 200 through a conduit 202 formed in the head 198 and armature 191. The passage 195 in the disk 192 is in constant communication with the cylinder or chamber 95 through a conduit 203.

In line with the chamber 197 and solenoid 190 is another chamber housing another solenoid 204 which constitutes what I may term the service solenoid. This solenoid, 204, is held in the chamber provided for it by a screw plug 205 on the exterior of which is formed a polygonal head 206 for the application of a wrench. Leading from the solenoid 204 to the chamber 197 is a smaller cylindrical passage 207 into which extends one end of the armature 208 of the solenoid 204. The outer end of this armature 208 is threaded to receive a cap nut 209, the end wall of which is centrally perforated and terminates in a peripheral flange 210. The nut 209 is of such exterior diameter as to fit snugly but freely in the passage 207, and surrounding the nut 209 between the flange 210 and the corresponding end wall of the chamber 197 is a spring 211. Extending through the central perforation of the end wall of the nut 209 is a stem 212, expanded into a head 213 within the nut and exterior thereto, and at the other end of the stem expanded into a conical head 214 constituting a valve adapted to be seated in the valve seat 201. A helical spring 215 surrounds the stem 212 between the head 214 and the end wall of the nut 209. The chamber 197 is in communication with the atmosphere by a constantly open port 216. The purpose of the spring 211 is to project the armature 208 a certain amount, which is determined by the resistance of the spring 215 which, however, is weaker than the spring 211, and both are light springs. The spring 211 has but little extensibility and at the position shown in the drawing it is supposed to have reached the limit of its extension and is only under such compression as may be produced by the lighter spring 215 which is always under a moderately strong tension. Under these circumstances, there is always sufficient space between the head 213 of the stem 212 and the bottom of the hole in the screw cap 209 to insure a snug seating of the valve head 214. The recoil of the spring 215 is such as to place the spring 211 under only enough tension to hold the armature 208 securely in position, as shown, and the valve 214 likewise. There is considerable space between the face of the head 213 and the threaded end of the service armature 208. Of course, the springs put a like strain upon the emergency solenoid armature 191 as they do on the service armature 208. However, the emergency solenoid is energized except when the controller for the valve, that is the triple valve as a whole, is put in the emergency position. Therefore, it follows that by virtue of the attraction of the solenoid 190, its armature 191 will remain in the position shown with the one exception noted, thus keeping the packing ring or gasket 193, which is made of rubber, firmly against the face of the disk 192, thus insuring an air tight rubber joint. The pull of the armature 191 and the tension of the springs 211 and 215 is resisted by the pressure of the air in the chamber 200, which pressure, while normally insufficient to do so, tends, however, to force the solenoid armature 191 in the direction to open the rubber joint by forcing the gasket 193 away from the face of the disk 192.

Referring now to Fig. 6. As has already been explained, the conduit 122 coming from the port 120 enters the chamber 123. This chamber is within the casting section 90. This chamber 123 communicates at one end with a larger chamber 217 concentric with the chamber 123. These two chambers are about the same length and respectively contain pistons 218 and 219 connected together by the piston rod 220. This piston rod extends past the piston 218, which is located near one end of the chamber 123 and at its extreme end is formed into a valve 221 which is adapted to seat in the valve seat 222 that opens directly into a boss 223 into which there is screwed the brake cylinder exhaust pipe, if retainers are used, but if such retainers are not used, then no pipe is present and the exhaust is direct to the atmosphere from the boss 223. A small hole 224 is drilled centrally in the rod 220 on the idle side of the valve, 221, and communicates with a radial hole 225 in the rod 220 back of the valve 221. This puts the chamber 123 in communication with the atmosphere, regardless of the position of the valve 221, whether open or closed. As to the relative areas of the conduit formed by the holes 224 and 225 and the valve opening, and the purposes, this will presently appear. The rod 220 extends beyond the piston 219 and acts as a stop for the pistons 218 and 219 by abutting against a disk 226 which is seated in the counterbored end of the chamber 217 with a packing ring 227 like the disks 145 and 192, before referred to. This disk 226 has a central hole through it formed into a valve seat on the end remote from the chamber 217, while the end of the piston rod adjacent to this disk is formed with a passage 228 similar to the combined passages 224 and 225 to prevent this end of the piston rod 220 from lapping the central hole in the disk 226.

Seated in the cylinder 124 before referred to, is the slow release solenoid 229. This cylinder is closed by a screw plug 230 like the screw plug 205 before referred to. This solenoid 229 has an armature 231 passing through an integral diaphragm 232 forming the base of the cylinder 124. This diaphragm is spaced from the disk 226 to form a chamber 233, which chamber is in constant communication with the conduit 122 by a port 234. The end of the armature 231 within the chamber 233 terminates in an annular flange 235 between which and the corresponding wall of the diaphragm or web 232 there is confined a helical spring 236. Beyond the flange 235 the armature is formed with an extension constituting a valve 237 adapted to seat in the valve seat formed in the disk 226. The spring 236 is a light spring designed to keep the valve 237 seated when the solenoid 229 is deënergized. The chamber formed between the two pistons 218 and 219 is in free communication with the atmosphere by a port 238.

In line with the conduit 143 before referred to, there is formed in the casing section 90 a chamber 239, and in line with this chamber is formed another larger chamber in which is housed a solenoid 240 which I may term the straight air lap solenoid. The end of the chamber containing the solenoid 240 is closed by a screw plug 241 similar to the screw plug 205 before referred to. This solenoid 240 has an armature 242 entering the chamber 239 and there expanded into an annular head 243 fitting the chamber and acting as a guide for the corresponding end of the armature. Between the head 243 and the corresponding end of the solenoid, the armature is surrounded by a helical spring 244, opposing the pull of the solenoid. On the outer end of the armature there is formed a valve 245 adapted to the valve seat 144 at the end of the conduit 143, and when the solenoid is not active, the spring 244 maintains this valve closed. Leading from the chamber 239 there is a conduit 246 opening into the cylinder 95.

The conduit 179, before referred to, has a branch 247 which may be connected by valve 182 to another conduit 248 leading around the chamber 95 and opening into the chamber 115, as indicated at 249.

Branched off from the conduit 178 is another conduit 250 in the path of a bridging recess 251 in the periphery of the valve 131, so that when the said valve is properly turned, the branch conduit 250 is coupled up to another conduit 252 opening into another cylinder 253 alongside of the cylinder 159. This last-named cylinder 253 is screwed into a chamber 297 like the chamber 152 before referred to, and also receives at its inner end a bushing 298 like the bushing 158 of the other cylinder, except that the bushing 298 has no valve seat formed in it. The cylinder 253 is provided with a tapered disk 299 held in place by the bushing 298, and with a valve 300 like the valve 171 of the cylinder 159. The cylinder 253 has a diaphragm 301 held in place by a locking ring 302 within which travels a head 303 on a pin or stem 304 entering a recess 305 in a screw plug 306 closing the outer end of the cylinder and protected by a cap 307, all like the similar parts in the cylinder 159. The pin 304 is surrounded by a spring 308 similar to the spring 169, except that it is adjusted to yield at a pressure exceeding fifty pounds per square inch, which is about the pressure an auxiliary reservoir at seventy pounds will equalize with the brake cylinder on emergency.

There is no solenoid in connection with the structure included in the cylinder 253. The end wall 309 of the chamber 297 is formed with a central boss 310 axially bored out to receive a spring 311 and the head 312 of the stem of the valve 300, like the head 174 and spring 176 of the valve 171. The chambers 152 and 297 are connected to a port or passage 271. To adjust the spring 308, a pressure gage is used, while the triple is in emergency with automatic air and the spring is set to the indicated pressure. Thus, as will hereinafter appear, whether straight air or automatic air is used, the braking power will be the same, and there will be no locking of the wheels on emergency with the attendant sliding and flattening of the wheel treads.

Now, since the electric triple is, of course, operated by an electric current properly applied, it is necessary to provide a controller by means of which the current may be distributed to the several solenoids as needed, in order that the triple may perform the various functions of which it is capable. I may here state that I have devised a type of controller especially adapted for the purposes of this invention and also for other purposes, such as the application of the brakes through the electric triple constituting the subject matter of the present invention and also for the running of a car equipped with power and controlled by mechanisms which form no part of the present invention. Nor does the type of controller which I have devised form a part of the present invention. For this reason, in the diagrammatic representation of the circuits, as shown in Fig. 7, the controller 254 is simply diagrammatically represented, and this representation will be found sufficient for the purposes of this description.

In Fig. 7, there are shown two leads 255 and 256 which, it is to be assumed, come from a suitable source of electric power, such, for instance, as a dynamo.

In the complete system to which the present invention particularly relates, the dynamo used is of the continuous current constant voltage type. Of course, other sources of power may be used and the invention is not limited to any particular source of electric current.

One side of the controller is connected by a conductor 257 to one of the leads, say, the lead 255. Extending from one of the contacts of the controller is a conductor 258 leading to one side of the solenoid 229. Another contact on the controller is connected by a conductor 259 to the solenoid 148 and by a branch conductor 260 to one terminal of a switch 261. The controller has another contact connected by a conductor 262 to one side of the solenoid 190, and another contact on the controller is connected by a conductor 263 to one side of the solenoid 204. The other side of the solenoid 229 is connected to a common return conductor 264 which, in turn, is coupled to the main 256. The other sides of the solenoids 204 and 190 are also connected to this same common return conductor 264. The solenoid 148 has its other side connected by a conductor 265 to one side of the solenoid 240, which latter has its other side also connected to the common return conductor 264. The branch conductor 266 leads from the conductor 265 to a switch 267 the other side of which latter is connected by a conductor 268 to the common return 264. The conductor 265 is also connected by a branch conductor 269 to the terminal of the switch 261 opposite that connected to the conductor 260.

The brake positions on the controller are full release, slow release, lap, service, and emergency. Now, first consider the conditions of full release. While using automatic air, the switch 261 is open and the switch 267 is closed. When using straight air, the switch 261 is closed and the switch 267 is open. Under the conditions to be assumed the switch 261 is open and the switch 267 is closed, while the controller lever is connected to conductor 259. Under these circumstances, current flows from conductor 255 through conductor 257 to the controller, thence by conductor 259 to the solenoid 148, through the switch 267 and then to the common return 264. Under these circumstances automatic air switch 261 being open and switch 267 being closed, the solenoid 240 is in a shunt circuit and thus being shunted is deënergized. There are circumstances when both switches 261 and 267 are open momentarily but never when brakes are to be operated, and in such condition the solenoids 148 and 240 are then in series. The current I propose to use may have a voltage of about twenty-five, so that under these conditions there will be but twelve and a half volts pressure in each solenoid, and the solenoids will receive but half of their normal current and this will not be sufficient to energize them operatively. However, under automatic air working conditions the switch 267 is closed and the solenoid 240 is in shunt. In the position of the controller already described, there is another path for the current, for the controller arm also makes contact with the conductor 262, and thus the emergency solenoid 190 is also energized. The next position of the controller is slow release. In this position, the electrical conditions already established are not changed, but a third circuit through the conductor 258 and solenoid 229 is established. The third position of the controller is lap and the circuit through the conductors 258 and 259 is broken, leaving only the circuit through the conductor 262.

The fourth position is service in which the circuit through the wire 263 and solenoid 204 is closed, the emergency solenoid 190 still remaining closed. In the fifth and last position, the circuits are all open. Thus it will be seen that for "full release", the automatic air lap solenoid 148 and the emergency solenoid 190 are energized; for "slow release", the automatic air lap solenoid 148, the emergency solenoid 190, and the slow release solenoid 229 are energized; for "lap", the emergency solenoid 190 is energized; for "service", the emergency solenoid 190 and service solenoid 204 only are energized, and for "emergency", all the solenoids are deënergized.

Now, suppose that with the parts in the position shown in Fig. 5, the engineman desires to make a service application of, say, ten pounds to apply the brakes with commensurate force. Under these circumstances, only the service solenoid 204 and the emergency solenoid 190 are energized. Now, since the solenoid 148 is not active, the spring 155 has closed the valve 156. The air in conduit 153' cannot now escape, no matter how low the pressure in cylinder 95 may fall, so pressure in the chambers 137 and 141 will be equal, and the valve 140 will remain closed. The emergency solenoid 190 remains as shown in the drawing. At the same time, the service solenoid 204 has drawn in its armature 208, thus compressing the spring 211. The small space between the head 213 and the bottom of the space in which it is seated is taken up, and the service valve 214 is thus opened. Air then escapes from the cylinder 95 through the conduit 203, by the valve 214 into chamber 197 and to the atmosphere through the port 216. This rapidly lowers the air pressure in the cylinder 95, and the train pipe under the one car considered. Since each car has a like equipment and all the equipments are connected up by electric conductors with the controller for simultaneous operation, the triples of all the cars in the train are operated at the same time to the same extent. With this understanding, the description following will deal with one car only.

The friction of the triple piston 96 and its valves is light, hence when reduction of pressure commences at the service valve 214, the triple piston 96 moves toward the wall 107, because of the now superior pressure in the auxiliary reservoir connected to chamber 115. By the time this movement of the piston 96 has carried the head of the bushing 109 a sufficient distance to engage the slide valve 116, the feed groove 133 has been lapped. Now, the graduating valve 113 has not moved in space since the spring 112 has expanded because of the motion of the triple piston 96, hence, the flange or head 110 now occupies a position about midway in the chamber 104. Now, as the reduction of pressure continues through the service valve 214, the motion of the triple piston 96 also continues, and the slide valve 116 is carried with it until the ports 120 and 121 are fully lapped. At this point, the flange 110 has reached the bushing 109, the tension of the spring 112 still keeping the graduating valve 113 seated. This is the "lap" position where all ports are lapped, still, the auxiliary pressure remains at seventy pounds, so that the triple piston 96 continues to travel toward the wall 107. At the latter position, the pin 106 is but a short distance from the wall 107, which distance is the exact full opening of the graduating valve 113, and the flange 110, being now against the bushing 109, this valve 113 opens as the pin 106 reaches the wall 107. The spring 105, if of sufficient tension, will now cause the pin 106 to act as a weak stop. However, the seventy pounds auxiliary pressure would continue the motion of the piston 96 were it not for the fact that the opening of the graduating valve 113 permits the escape of the auxiliary pressure into the conduit 126. Now, since the port 121 is lapped, the only path for the auxiliary pressure is through the conduit 127 into the pipe leading to the brake cylinder.

The engineman having reduced the pressure in chamber or cylinder 95, and hence in the train pipe, by ten pounds, places his controller on lap. In this position, only the emergency solenoid 190 is energized. The circuit through the solenoid 204 being now open, the springs 211 and 215 seat the valve 214. No further reduction can therefore occur in the cylinder 95, also the feed valve 171 cannot restore the pressure to seventy pounds, since the solenoid 148 is not active and the valve 156 is still closed. Thus, there is now only sixty pounds pressure in the train pipe and cylinder or chamber 95, while the auxiliary pressure is exhausting by the valve 113. When the auxiliary pressure is lowered to sixty pounds, the pressures are, of course, equal on each side of the triple piston 96, which, therefore, now ceases to move toward the wall 107 after having pushed the pin 106 thereagainst, perhaps compressing the spring 105 to a slight extent. An instant after this, the auxiliary pressure is lower than sixty pounds and the piston 96 begins to move away from the wall 107 and closes the valve 113. This movement, however, does not actuate the slide valve 116, because of the play between the head of the bushing 109 and the said valve. Under these conditions, the triple is lapped in agreement with the position of the controller under the hand of the engineman.

Suppose, now, that the engineman desires to release the brakes, say, by the slow release, to which he sets his controller. In this position, the emergency solenoid is still energized, as is also the automatic-air lap solenoid 148 and the slow release solenoid 229. The solenoid 148 now opens the valve 156 and since the pressure of the air in front of the diaphragm 164 is less than seventy pounds, the spring 169 opens the valve 171 and the chamber 137 thereupon equalizes with the sixty pounds pressure in the cylinder 95. The piston 135 is then moved to open the port 177, and the cylinder or chamber 95 is thereupon fed up to the regular seventy pounds pressure, whereupon the valve 171 closes, as before described. The superior pressure in the chamber or cylinder 95 now drives the triple piston 96 to the release position shown in Fig. 5, and conduit 122 is put in communication with the brake cylinder through the conduit 127 and boss 128. The air in the brake cylinder now escapes by way of the conduits 127, 125 and 122 into the chamber 123 of the slow release structure shown in Fig. 6. Since the solenoid 229 is energized, the valve 237 is opened and the brake cylinder pressure enters by way of the port 234 and through the open valve 237 into the space between the disk 226 and piston 219. There is then an equal air pressure on the left hand side of piston 218, as viewed in Fig. 6, and the right hand side of piston 219, as viewed in the same figure. No pressure can accumulate in the chamber 217 because of the open port 238, should there be leaks past the pistons. Now, while the pressure to the square inch on the opposite sides of the pistons 218 and 219 is equal, the greater absolute pressure will exist on the right hand side of the piston 219 on account of the greater area of this piston, and the valve 221 will thereupon close. Now, the brake cylinder air pressure can only escape through the hole or conduit 224, 225, and the smallness of this hole makes the escape gradual and in proportion to the size of the hole. The brakes will thus come off slowly. This is of value when an engineman notes that he has misjudged in not applying the brakes heavy enough, so that a release, that is a full release, would cause the train to pass the stopping point, so he has simply to come back from full release to slow release and then can stop more accurately.

Now, assume that the full release condition is desirable. This is the same as slow release, except that the solenoid 229 is deënergized, and the spring 236 closes the valve 237, so that no more air reaches the chamber between the disk 226 and piston 219, and such air as may be in this chamber soon leaks by the piston 219 into the chamber 217 and out through the port 238. Now, since the brake cylinder pressure when it enters the chamber 123 and pushes against the piston 218 has no longer a counter-pressure opposing it, so the valve 221 at once opens. The area of this opening is fully adequate, as are the other exhaust passages, to secure an almost instant release of the brakes. Of course, the pistons 218 and 219 may be provided with packing, if desired, and this may be resorted to when retainers are used to prevent the retained brake pressure from gradually leading off into chamber 217 and thus reaching the open air.

When the controller is placed upon the fifth or "emergency" position, the same effect as in the service application results through the action of the solenoid 190 which, for the first time, is deënergized, instead of the solenoid 204. However, the effect is intensified. Now, when the solenoid 190 is deënergized, the air in the cylinder or chamber 95 will force the armature 191 away from the disk 192 until the rubber gasket 193 is entirely free from the corresponding wall of said disk. The springs 211 and 215 offer but little opposition to this movement. The flow of air is then much greater since the openings are larger than in the service application where air can only escape past the small valve 214.

Now, when emergency is used as intended, that is in times of danger, and the like, it is important that the train pipe be entirely exhausted in order that the full value of the air pressure in the auxiliary reservoir may be used. Though the instructions issued by railways to the enginemen are for them never to lap on emergency but leave the valve on emergency until the train comes to a full stop, still, sometimes, an engineman may become excited in times of danger and lap his valve on emergency, thus giving only a partial application of the brakes. Again, some enginemen handling long trains are, to save time, in the habit of making a fairly heavy service reduction until they "get the slack", after which they make an emergency application for the stop, thus stopping suddenly. It is true that this does save time when numerous stops are to be made, but it is not advisable and is more or less destructive to rolling stock, and, furthermore, is against "orders", but still this practice is persisted in by some enginemen. All this is avoided by my invention.

As is known, the effect of magnetism increases or decreases in an inverse ratio to the square of the distance, neglecting magnetic leakage. The area of the head 198 within the chamber 200 is such that the air pressure against it may exert a considerable pull on the armature 191, yet this armature, being almost all the way in the solenoid, the air gap being, say, but one-sixty-fourth of an inch, or thereabout, the air pressure on the head within the chamber 200 is considerably less than the magnetic pull of the armature in this position, still when the head has moved but a slight distance outwardly, the pushing action of the air may be several times the pull of the solenoid. Thus, let the circuit be broken but an instant through the solenoid 190 and immediately the emergency begins to act and cannot be stopped until the train pipe is empty or nearly empty of air. Of course, the engineman can lap his controller, but the triple will absolutely not lap on emergency, for, as long as pressure exists in the chamber 95, and the solenoid 191 is out, energizing the solenoid 190 will not pull the armature back against the air pressure until such air pressure is very low or absent. If the engineman laps my triple valve on emergency, he will only succeed in energizing the solenoid 190 without effect. If he tries to release before the brakes set to full emergency he cannot stop the emergency application, since he will only waste main reservoir air for it will flow out of the chamber 95 faster than the valve 140 can supply it, since the conduit 203 is of greater area than the port 177. Although this will make the emergency application slower, the brakes will set just the same, though not so quickly. Of course, if it is desirable, this feature of the triple valve may be omitted, and the head 198 may be made small like the other solenoid valves, and while it will perform its work, it still can be lapped or released like the valves in ordinary use. After the cylinder 95 is empty, that is, having little or no air pressure therein and therefore there being no air pressure to oppose the solenoid 190, the energization of the latter will draw in the armature 191 and the brakes may then be released as before.

The port 216, Fig. 9, is supplied with a large spigot or pet cock 270, so that if this port be closed, then the triple can be used in any train and will work with existing types of air brakes. In such case, no electricity is present, as the car equipped with my triple valve is a trailer in a locomotive train with the usual hose connections. Under these conditions, the pet cock 270 will prevent escape of air from the chamber 95 and the valve 171 will remain closed, since no electricity is present to energize the solenoid 148. Exhausting the train line in the usual manner will of course effect the pressure in chamber 95 and my triple is then to all intents and purposes the same as the ordinary triple. In this case it is not quick action, though it is while being used electrically. If desired, the quick action valve of the usual quick action triple may be added without detriment to my triple. Since at emergency all solenoid circuits are open, it follows that should the train break in two all triples in the rear of break will go into emergency when used electrically and the controller will throw all head triples into emergency also.

Of course, all the slide valves in my triple are provided with the usual bow springs to hold them to their seats in the absence of air, hence no air can blow back into the chamber 140. Or, a check valve may be interposed between the boss 142 and the main reservoir pipe. The triple will therefore act as an ordinary triple in which the air in the train is under the control of the engineman's valve, thus the induction will effect the chamber 95 just the same as the solenoids 190 and 204.

The use of the triple with straight air will now be considered, and, since heretofore straight air has usually been used only on single cars, I will also show how with my invention it can be used on full trains with even more advantage than automatic air. Attached to the valve 182 is a handle similar to the handle 132, though not shown in the drawings, and these two handles or levers are connected to another lever, not shown, for synchronous operation. When straight air is to be used, these valves are moved from the position shown in Fig. 5 to a position where with the valve 131 the passage 129 is blocked and the ducts 250 and 252 are bridged by the channel 251. Also, with the valve 182 the ducts 184 and 186 are blocked and the ports 183 and 185 are brought into coincidence with the ducts 247 and 248, thereby connecting them. At the same time, the switch 267 is opened and the switch 261 is closed, these two switches being also suitably connected to the operating lever for such operation. Of course, any type of switch may be used, and the various wires leading to the different solenoids may be inclosed in suitable cavities and conduits in the triple for protection. Furthermore, the chamber 152 is in communication through the port 271 with the corresponding chamber in the cylinder 253, or, as a matter of construction, these two chambers might be cast as a more or less rectangular chamber, instead of two cylindrical chambers. Now, by the opening of the switch 267, and the closing of the switch 261, the solenoid 148 is cut out of circuit and the solenoid 240, which may be called the straight air lap solenoid, is now in the circuit, under the same conditions, electrically, as before prevailed with relation to the solenoid 148.

Reverting to the controller positions, at "full release", the solenoid 240 and the solenoid 190 are both active, and since the solenoid 240 is active, its armature 242 compresses the spring 244 and thus opens the valve 245. This places the conduits 143 and 246 into communication, and thus the cylinder 95 is coupled to the chamber 141, in which latter exists the main reservoir pressure, anywhere from ninety to one hundred and fifty pounds, unless the usual feed valve before mentioned maintains it at ninety pounds in chamber 141, a pressure of ninety pounds being considered in the following description. Then, the triple piston 96 at full release will have a pressure of ninety pounds on the side toward the wall 107, and thus will be driven to the full release position shown, where, on account of the feed groove 133, the pressure will equalize at ninety pounds in both the chamber 95 and the chamber 115. Now, at the service position, the solenoid 204 will open the valve 214, while the solenoid 190 will keep the head or valve 196 closed. Now the pressure in the chamber 95 is rapidly reduced and the piston 96 moves toward the wall 107 and the valve 113 is ultimately opened, as has already been described. Now, since solenoid 240 operates said straight air instead of solenoid 148 and since for the service position with automatic air solenoid 148 is not active, then for service position on straight air which is now being considered it follows that the valve 239 has seated on seat 144. Consider, then, that the conduit 178 is in communication with the chamber which, to commence with, contained ninety pounds pressure. It is evident that since the feed valves in the cylinder 253 are now adjusted for fifty pounds pressure, that the pressure in the conduit must be reduced to a little less than fifty pounds before the feed valve 140 will feed air through the conduits 179 and 248 into the chamber 115. When the valve 214 first began to exhaust the air from chamber 95, the excess pressure in chamber 115, of course, placed the triple in lap, and, continuing, opened the service valve 113, as has heretofore been explained. The result of this is that the chamber 115 commences to exhaust into the service port and hence into the brake cylinder. The amount of air is small, and soon the pressure falls, and as the valve 113 is larger than the valve 214, the triple laps, (this on service). This stops the pressure flowing into the brake cylinder, and the pressure constantly falling in the chamber 95, the piston 96 cannot go to release, but it begins to again open the service port 114 and holds it open just long enough to allow the pressure in chamber 115 to be reduced in unison with the pressure in the chamber 95. Very soon pressure in chamber 95 is reduced below fifty pounds, since this chamber is actually very small. This of course, reduces the pressure in conduit 178 and then the valve 140 feeds air into chamber 115, and soon brings its pressure up to fifty pounds, thus opening the service port 113. As long as air is exhausted from the chamber 95 through the valve 214, which is done more quickly than air can leak past the piston 135 into chamber 137 and thence ultimately to chamber 95, the pressure will be gradually falling, even if some air is coming into the chamber 95 through the conduit 178. Hence, the piston 96 is moved toward the wall 107 until the pin 106 touches that wall and the service port 113 is fully open.

Now, the engineman places his valve on lap. This closes, as has been before explained, the valve 214. Now it takes but an instant for the pressure leaking past the piston 135 to bring up the pressure in the chamber 95 to fifty pounds, when the valve in the cylinder 253 corresponding to the valve 171 closes, and air ceases to come into the chamber 95. The accumulating air in the chamber 137 then equalizes with the main reservoir pressure and the valve 140 cuts off the flow of air into the chamber 115. The triple valve at once comes to lap, as the pressure in chamber 115 exhausts to a point where the now superior pressure in the chamber 95 closes the valve 113. Of course, as the piston 96 comes to lap, there is an enlargement of the chamber 95 in its effective capacity, and a consequent reduction of air pressure. It might be concluded that this would operate the feed valve, but this is not the case, since the piston 96 moves steadily because the pressure decrease in the chamber 95 is gradual. Consequently the pressure is not decreased materially, being, in fact, about the capacity of the leak past the piston 135, and ultimately into the chamber 95.

The emergency application will, as in the automatic-air, merely result in a quicker reduction of air pressure in the chamber 95, moving the piston 96 to the extreme limit of its travel toward the wall 107. When on the straight-air it is desired to release on either slow or full release, the solenoid 240 is energized, and the main reservoir air enters through the conduit 246 into the chamber 95. Of course, the superior pressure of this air moves the triple valve 96 into release position, and then the release is full or slow according to the position of the controller.

Referring now to Figs. 14 and 15, there is shown a brake cylinder 272. This brake cylinder is preferably of a duplex type having two pistons 273, 273, each of which has a piston rod 274 extending through the corresponding end of the cylinder and there connected to a rock arm 275 fast on the rockshaft 276 by means of which movement of the corresponding piston 273 is ultimately transmitted to the brake shoes. The brake cylinder 272 may therefore be mounted directly in the trucks and "foundation brake rigging" dispensed with. Air from the triple valve enters the brake cylinder between the two pistons by means of the pipe 277 coming from the boss 128 of the triple valve. Each piston 273 has a suitable packing 278 here shown as a ring, generally a leather cup packing, and a corresponding piston rod surrounded by a helical spring 279 between the piston and the end of the cylinder through which the piston rod passes. This spring yields to the air pressure and when the brake cylinder is exhausted returns the piston to its normal position at the middle of the cylinder, at the same time carrying the brake shoes away from the wheel treads. The piston rods may project a short distance beyond the working faces of the pistons or projecting bosses may there be formed, as shown at 280, so that when the pistons are brought to the middle of the cylinder, they are still separated by a short space for the entrance of the air between them. This space should be small to prevent loss of air. When air enters the brake cylinder through the pipe 277, the pistons are driven away from the middle position toward the ends, and the brakes are applied to the wheels in accordance with the air pressure entering the brake cylinder.

The brake rigging has been omitted from the drawings, since it forms no part of the present invention and is not necessary to an understanding thereof, and in practice may be dispensed with entirely, as stated. In the practical embodiment of the invention, there is a brake cylinder 272 in each truck.

Now, to insure the completion of the emergency application of the brakes to the fullest extent, so that this application can neither be lapped or released prior to such completion, the brake cylinder is provided with an auxiliary device which I will now describe and which is best shown in Fig. 14. There is an offset terminating in a cylinder 281 cast on or attached to the brake cylinder, and this cylinder 281 is connected to the interior of the brake cylinder by a conduit 282 opening into the closed end of said cylinder 281, the other end of the latter being open and threaded, as shown. Entering the threaded end of the cylinder 281 is a cup 283 closed at the outer end, except for a central perforation, and carrying a jam nut 284 by which the extent of insertion of this cup into the cylinder 281 is fixed, that is, after the cup 283 has been screwed to the desired extent into the cylinder 281, the jam nut locks it in this position. The exterior of the cup 283 is threaded throughout its length, and receives on its outer end a cap 285 in the crown of which are two spaced terminal plates or electrodes 286 suitably insulated from the cap, or the latter may be made of insulating material. One of these plates 286 is connected to the dynamo lead 256, and the other plate 286 is connected by a branch conductor 287 to an electro magnet 288 or solenoid, the latter being preferable, which, in turn, is connected to the other dynamo lead 255. The connections between the dynamo leads and the contact plate 286 and magnet 288 is by way of branch conductors 289. Interposed in the conductor 262 leading to the emergency solenoid 190 is a switch 290, the movable member of which is under the control of the magnet 288, and a spring 291 maintains the switch arm in position to keep the circuit through the conductor 262 closed when the magnet 288 is not active.

Within the cylinder 281 is a piston 292 provided with a suitable packing 293, or preferably a crown leather packing, and having a piston rod 294 extending through the opening in the cup 283 and into the cap 285 where it carries a plate 295 of conducting material of such size as to bridge the contact plates 286 when brought into engagement with them. The plate 295 is insulated from the rod 294. The piston rod 294 is surrounded by a strong helical spring 296 confined between the piston 292 and the closed end of the cup 283. The piston rod may extend through the working face of the piston 292 or a boss may project therefrom, as indicated at 297, to prevent the piston from coming too close to the closed end of the cylinder 281 under the action of the spring 296. This spring 296 is of sufficient strength when so adjusted that it will yield to or just balance the pressure in the brake cylinder when the emergency application is made, and the smallest extra amount of air pressure in the brake cylinder will carry the piston 292 to a point where the bridging contact 295, say a copper disk, engages the terminals 286. This closes the circuit through the magnet 288 and opens the switch 290, thus deënergizing the emergency solenoid 190, so that the engineman or motorman, as the case may be, can neither lap nor release the brakes should he try to do so. Under these circumstances, the train will come to a standstill, after which the brake cylinder may be bled through the regular bleeding valve, in order that the brakes may be released. However, there may circumstances arise when after an emergency application it becomes imperative that the brakes be released. For this purpose, the bleeding valve of the brake cylinder may be made accessible by means of a wire carried up through a pipe in the car to an iron box covered by a glass panel with a small hammer hung by a chain adjacent to the box, so that the engineman or motorman, by breaking the glass panel may reach the wire and so bleed the brake cylinder and thus release the brakes, which may be done almost at once. The broken glass will indicate that a full brake application was made generally, although not always, when not needed. It is to be understood, however, that this structure is a special structure more particularly adapted for single high speed suburban cars since with either straight or automatic-air the pressure of the air on piston 292 suffices to prevent partial emergency application unless the main reservoir air is wasted. Also it would be inconvenient to bleed every brake cylinder on a train, although it is easily done on one car. The device is therefore supplementary and may or may not be used.

Reverting to the pump structure, it is to be noted that, as better shown in Fig. 16, the crank-shaft 13 is particularly shaped for strength even though there be cranks formed in it. It is to be further noted with reference to the pump structure that the journal caps 10 are on the under side of the pedestals 8 so that these caps are relieved from the reactional thrust of the pistons when moving against the back air pressure. Therefore the nuts holding these caps on need not be of exceptional strength but the nuts holding the pedestals in place may easily be made of ample strength since the pedestals are more massive than the caps and are easily constructed to withstand the pump strains. It may be further added that the several bearings on the pump structure are in practice suitably bushed or filled with any of the bearing metals such as babbitt, phosphor bronze or other metals used for the purpose.

Referring again to the duplex brake cylinders of Figs. 14 and 16, it is to be noted that the two pistons act directly upon the brake shoes, indicated at 313 in Fig. 15, through the rock arms 275, rock-shafts 276, and other rock-arms 314 fast on the shaft 276, thus doing away with the usual "foundation brake rigging" which rigging is a source of trouble, and also eliminating the strains between the car body and the truck. Each truck is provided with the brake structure of Fig. 15, as has been already explained.

What is claimed is:—

1. In an air brake system, means for maintaining in the main reservoir a pressure sufficient to permit two or more full service or emergency reductions and release for each without bringing the air pump into action.

2. In an air brake system, a main reservoir and an air pump located on each car, and means for maintaining in the main reservoir a pressure sufficient to permit two or more full service or emergency reductions and release for each without bringing the air pump into action.

3. In an air brake system, an air pump, and a governor therefor responsive to air pressure, said governor yielding to a predetermined high pressure to move in a direction to cut out the pump and being then subjected to a higher absolute pressure to complete the movement.

4. In an air brake system, an air pump, a driving element, a clutch for coupling the driving element to the pump and for uncoupling it therefrom, and a governor for controlling the clutch, said governor acting to couple the pump and driving element together at a pressure over and above a pressure sufficient to permit a full release after a full emergency reduction and yielding to uncouple the pump and power elements only after the pressure has risen to a point permitting a full brake release after not less than two emergency or full service reductions in succession.

5. In an air brake system, an air pump, and means for rendering the same active when the main reservoir pressure is still sufficiently high to permit a full brake release after a full emergency reduction and for rendering the pump inactive when the pressure has reached a point sufficient to permit a full brake release after not less than two emergency or full service reductions in succession without bringing the pump again into action.

6. In an air brake system, a governor for putting the air pump into and out of action, said governor being provided with an air duct and an air valve in said duct for closing and opening the same, said valve having two active surfaces of different areas subjected in succession to the air pressure.

7. In an air brake system, a governor for putting the air pump into and out of action, said governor having a valve having a surface subjected to air pressure, a spring balancing the absolute maximum air pressure to which said valve surface is subjected without yielding, and another surface on said valve of larger area than the first-named surface and subjected to the air pressure when the valve yields under air pressure on the first-named surface.

8. In an air brake system, a governor for putting the air pump into and out of action comprising a valve having two surfaces of different area adapted to be subjected to the air pressure, a spring acting on the valve and balancing the same for a predetermined high pressure acting on the smaller area, a governor member actuated by air pressure in one direction and a spring in the other direction, and another valve carried by the first-named valve for controlling the air acting upon the said governor member.

9. In an air brake system, a governor for putting the air pump into and out of action comprising a valve having two surfaces of different area adapted to be subjected to air pressure, a spring acting on the valve and balancing the same for a predetermined high air pressure on the smaller area but yielding to the action of the same air pressure on the larger area, an air chamber in the governor into which the flow of air is controlled by said valve, another valve formed on the first-named valve and controlling the outflow of air from said chamber, and a governor member controlled by the air pressure within said chamber.

10. In an air brake system, an air pump, means for coupling the air pump to and uncoupling it from a power element, a governor having a member actuating the means for coupling and uncoupling the air pump from the power element, said member being controlled by air pressure, and a valve in the governor controlling the air pressure acting on the said governor member and itself controlled by air pressure, said valve being more active to air pressure than is the said governor member.

11. In an air brake system, a governor for putting the air pump into and out of action, said governor having an air controlled and controlling valve with different areas active to the air pressure at different time periods of its movement, and a governor member also controlled by air pressure and having different areas active to the air pressure at different time periods of its movement.

12. In an air brake system, a governor for putting the air pump into and out of action and controlled by air pressure, said governor having a valve set to close the air inlet to the governor at a predetermined low pressure, and a governor member also controlled by air pressure and movable to put the pump into action at an air pressure lower than the pressure under which the valve is movable to cut off the air supply to the governor.

13. In an air brake system, a governor for putting the air pump into and out of action, said governor having an air controlled member presenting different areas to the action of the air at correspondingly different phases of its movement, and a valve for controlling the air pressure acting upon the governor member, said valve also being controlled by the air pressure and presenting different areas to the action of the air pressure at correspondingly different phases of its movement.

14. In an air brake system, a governor for the air pump having a cylinder communicating with the pressure side of the pump, and a valve in said cylinder provided with a valve stem carrying a piston fitting said cylinder, a valve head on one side of said piston adapted to close communication between the pressure side of the pump and said cylinder, said valve head being of less area than the piston, and a spring acting to move the valve head to the closed position and exerting an absolute pressure balancing a predetermined air pressure exerted on the valve head when the said valve head is in the closed position.

15. In an air brake system, a governor for the air pump provided with an air chamber, a cylinder communicating with said air chamber and with the pressure side of the pump, a piston in said cylinder, a valve rod carrying said piston and formed on one side of said piston with a valve head and having its other end also formed into a valve, a conduit leading from the said chamber into the cylinder on the side of the piston remote from the valve head, said cylinder being there provided with a port leading to the external air, a spring in the cylinder acting to move the valve head to the closed position, and a governor member controlled by air entering the said chamber and acting to open and close the conduit leading to the cylinder on the side of the piston remote from the valve head.

16. In an air brake system, a governor for the air pump provided with an air chamber, a cylinder communicating with said air chamber and with the pressure side of the pump, a piston in said cylinder, a valve rod carrying said piston and formed on one side of said piston with a valve head and having its other end also formed into a valve, an elastic seat for the valve head, a conduit leading from the said chamber into the cylinder on the side of the piston remote from the valve head, said conduit being provided with a valve seat for the valve formed on the corresponding end of the valve rod, a spring in the cylinder acting to move the valve head to the closed position, and a governor member controlled by air entering the said chamber and acting to open and close the chamber end of the said conduit.

17. In an air brake system, a governor for the air pump provided with an air chamber, a cylinder communicating with the said air chamber and the pressure side of the pump, a piston in said cylinder, a valve rod carrying said piston and formed on one side thereof with a valve head and having its other end formed into a valve, an elastic seat for the valve head, a conduit leading from the said air chamber into the cylinder on the side of the piston remote from the valve head, a spring in the cylinder acting to move the valve head to the closed position, a flexible diaphragm forming one wall of the air chamber and movable to close and unclose the chamber end of the conduit, and a spring controlled governor member engaging the diaphragm on the side remote from the air chamber.

18. In an air brake system, a governor for the air pump, responsive to air pressure, said governor being provided with a valve controlling the inlet of air to and the outlet of air from the governor, the said valve being timed to close the air inlet before the outlet is fully opened, and to close the air outlet partially before the air inlet is open and to complete the closing of the air outlet after the inlet has begun to open.

19. In an air brake system, a governor for the air pump, responsive to air pressure, said governor being provided with a valve controlling the inlet of air to and the outlet of air from the governor, said valve being provided with an elastic seat at the inlet end so that the valve may have a range of movement before the inlet is opened and after it is closed.

20. In an air brake system, a governor for the air pump having a cylinder communicating at one end with the pressure side of the pump, an air chamber communicating with the cylinder, a conduit leading from said air chamber to the end of the cylinder remote from the inlet end, an annular groove formed at the inlet end of the cylinder, an elastic valve seat in said groove, a valve rod formed at one end with a valve head adapted to the elastic valve seat and at the other end with a valve adapted to a valve seat formed in the conduit, a piston fast on said valve rod and contained within said cylinder, and a spring surrounding the valve rod between the piston and the conduit end of the cylinder.

21. In an air brake system, a triple having a main piston operated by a difference of pressure on opposite sides, a chamber in constant communication with the main air supply, a conduit leading from said chamber to the main-pressure side of the main piston, a valve controlling the influx of air to the conduit, a piston controlling the last-named valve and constructed to permit air to leak by it, and air connections between the inactive side of the last-named piston and the main-reservoir side of the main piston.

22. In an air brake system, a triple having a main piston operated by a difference of pressure on opposite sides, a chamber arranged to be placed in constant communication with the main reservoir, a conduit leading therefrom to the main-pressure side of the main piston, a valve controlling the influx of air to the conduit, a piston controlling the last-named valve and constructed to permit air to leak by it, air connections between the inactive side of the last-named piston and the main-reservoir side of the main piston, and a valve in the said air connections movable on a predetermined reduction of air pressure therein on the side connected to the main reservoir side of the main piston.

23. In an air brake system, a triple having a main piston operated by a difference of pressure on opposite sides, a chamber adapted to be placed in constant communication with the main reservoir, a conduit leading therefrom to the main-pressure side of the main piston, a valve controlling the influx of air to the conduit, a piston controlling the last-named valve and constructed to permit air to leak by it, air connections between the inactive side of the last-named piston and the main-reservoir side of the main piston, a valve in the connections last named, and a spring actuated member tending to open said valve and held inactive by the air pressure on the main-reservoir side of the main piston except when such pressure falls below a predetermined point.

24. In an air brake system, a triple having a main piston operated by a difference of pressure on opposite sides, a chamber adapted to be placed in constant communication with the main air supply, another chamber, communicating means between the two chambers permitting the slow accession of air to the second chamber, means of communication between the second chamber and one side of the main piston for the passage of air thereto, and a valve in the last-named means of communication constrained to open when the pressure on the main piston side of the valve is reduced below a predetermined point.

25. In an air brake system, a triple having a main piston operated by differential pressure, a chamber adapted to be placed in constant communication with the main air supply, a conduit in communication with said chamber, a valve in said conduit responsive to a certain predetermined air pressure, and an electrically operated valve for cutting off communication between the first-named valve and the chamber communicating with the main air supply.

26. In an air brake system, a triple having an air chamber adapted to be placed in communication with the main air supply, a main piston operated by differential air pressure, communicating means between the chamber for receiving the main air supply and one side of said piston, a valve in said communicating means, a flexible diaphragm controlling said valve, and a spring acting on the diaphragm from the side remote from said valve and adapted to yield for the closing of the valve under the action of a predetermined air pressure.

27. In an air brake system, a triple having a main piston operated by differential pressure, a chamber adapted to be placed in constant communication with the main air supply, air conducting passages between the said chamber and one side of the main piston, two valves in said conducting means, one of said valves being responsive to open when the air pressure on the piston side is reduced to a certain predetermined point, and the other valve responding to a lower air pressure, and means for cutting the piston side of the low pressure valve out of communication with the main piston.

28. In an air brake system, a triple having a main piston operated by differential pressure, a chamber adapted to be placed in constant communication with the main air supply, air conducting passages between the said chamber and one side of the main piston, two valves in said conducting means, one of said valves being responsive to open when the air pressure on the piston side is reduced to a certain predetermined point, and the other valve responding to a lower air pressure, means for cutting the piston side of the low pressure valve out of communication with the main piston, and an electrically operated valve between the higher pressure valve and the chamber receiving the main air supply to cut in the high pressure valve.

29. In an air brake system, an electrically operated triple having a solenoid provided with an armature having its free end formed with a head and terminating in a valve, a spring surrounding the armature between the head and solenoid and having a normal tendency to seat the valve, a valve seat in the path of the valve on the armature and in which the said valve engages when the solenoid is deënergized, another valve in line with the armature and having a stem entering an axial recess in the armature, a spring in the recess in the armature and tending to move the second valve away from the armature, a seat for the last-named valve, a flexible diaphragm tending to urge the last-named valve against the action of the spring in the armature, and a spring on the side of the diaphragm remote from the valve engaged thereby and imparting to the said diaphragm the tendency to unseat the said last-named valve.

30. In an air brake system, a triple having a main piston operated by differential air pressure, a chamber adapted to be connected to a source of main air supply, a conduit leading from said chamber to each side of the main piston, a valve in said conduit movable to couple the chamber to either side of the piston, a valve movable under differential air pressure and controlling said conduit, means on the side of the conduit controlling valve remote from the main pressure side responsive to two different pressure reductions, and means for rendering one or the other of the reduced pressure responsive means in accordance with the position of the valve in the said conduit.

31. In an air brake system, an electric triple having an air escape duct leading from the chamber in which moves the main piston, a ported valve covering the escape end of said duct, a solenoid and armature controlling said valve, another solenoid and armature, and a valve carried by the last-named armature for controlling the port in the valve controlled by the first-named armature.

32. In an air brake system, an electric triple provided with an escape conduit for the air leading from the chamber in which the main piston moves, a solenoid, an armature for said solenoid, an expanded head formed on said armature, and a yielding valve seat carried by the head and adapted to surround the exit end of the conduit.

33. In an air brake system, an electric triple having an air escape duct leading from the chamber in which moves the main piston, a solenoid, an armature for said solenoid, an expanded head formed on said armature, and a gasket seated in said head and extending beyond that face thereof contiguous to the solenoid, said gasket inclosing a chamber into which the exhaust end of the duct leads.

34. In an air brake system, an electric triple having an air escape duct leading from the chamber in which the main piston moves, a solenoid, an armature for said solenoid, an expanded head formed on said armature and provided with a port extending through said head, an annular gasket on the face of the head contiguous to the solenoid and of sufficient diameter to include the exhaust end of the duct, an elastically yielding valve for the port in the solenoid armature head, and another solenoid for controlling the valve closing the port in the armature head.

35. In an air brake system, an electric triple having an air escape duct leading from the chamber in which the main piston moves, a solenoid adjacent to the exit end of said duct, an armature for said solenoid having an expanded head with a central port through the same, an annular gasket on the face of the armature head contiguous to the solenoid, said gasket projecting beyond said face, another solenoid in line with the first-named solenoid, an armature for the second solenoid, and a valve carried by said last-named armature and adapted to close the port in the head of the first-named armature, said valve having a limited range of movement independent of the armature carrying it.

36. In an air brake system, an electric triple having an air escape duct leading from the chamber in which the main piston moves, a solenoid adjacent to the exit end of said duct, an armature for said solenoid having an expanded head with a central port through the same, an annular gasket on the face of the solenoid head contiguous to the solenoid, said gasket projecting beyond said face, another solenoid in line with the first-named solenoid, an armature for the second solenoid, a valve carried by the said last-named armature and adapted to close the port in the head of the first named armature, said valve having a limited range of movement independent of the armature carrying it, and a spring acting on said valve and tending to move it away from the armature.

37. In an air brake system, an electrically operated triple having means for automatically completing an emergency application of the brakes when the triple is once set at the emergency position.

38. In an air brake system, an electric triple having an emergency solenoid, and a valve controlled thereby inclosing an air duct when the solenoid is energized, said valve being proportioned to present a greater resistance to the pull of the solenoid when moved to the open position and subjected to the out-rush of air than can be overcome by the pull of the solenoid when the valve is in such open position.

39. In an air brake system, an electric triple having a release mechanism comprising an air duct adapted to be put in communication with the brake cylinder and leading to a point of discharge, a valve interposed in said duct and operating by air pressure differentially applied to the valve, and another electrically operated valve for closing the first-named valve to the slow release position.

40. In an air brake system, an electric triple having a release mechanism comprising an air duct leading to a point of escape and adapted to be connected to the brake cylinder for the discharge of the latter, a valve in said air duct movable to full open position by the escaping air acting on one side of said valve, another duct leading from the main duct and communicating with the other side of said valve and arranged to exert greater absolute pressure thereon by the air than is exerted by the air on the first-named side of the valve, and electrically operated means for controlling the passage of air from the last-named duct to the corresponding side of the valve.

41. In an air brake system, an electric triple having a release mechanism comprising an air duct leading to a point of escape and adapted to be connected to the brake cylinder for the discharge of the latter, a valve in said air duct provided with a leak passage and movable to full open position by the escaping air acting on one side of said valve, another duct leading from the main duct and communicating with the other side of said valve, said other side being of greater area than the first named side, a valve controlling the admission of air to the larger side of the valve, and electric means for opening said valve.

42. In an air brake system, an electric triple having a release mechanism comprising an air duct leading to a point of escape and adapted to be connected to the brake cylinder for the discharge of the latter, a valve for controlling the escape opening of the duct, said valve comprising a valve head with a leak passage therethrough, a valve stem carrying said valve head, two pistons of different area on said valve stem, the smaller piston being always under the action of the escaping air, a duct leading from the main duct to permit the access of air to the larger piston in opposition to the smaller piston, a valve between the duct and piston, an electric solenoid, and an armature for said solenoid carrying said valve, said armature being constrained to normally close the valve and to open it when the solenoid is energized.

43. In an air brake system, an electric triple having a duct directly communicating with the main air supply of the triple and also communicating directly with the chamber in which the main piston of the triple moves, and an electrically operated valve for opening and closing said duct between the main air supply and the chamber containing the main piston.

44. In an air brake system, an electric triple having a duct directly communicating with the main air supply of the triple and also directly communicating with the chamber in which the main piston of the triple moves, a valve interposed in said duct, a solenoid, an armature carrying said valve, and a spring acting on the armature in opposition to the solenoid to hold the valve closed except when the solenoid is energized.

45. In an air brake system, an electric triple provided with an electrically operated emergency valve operating by the deënergization of the electric controlling means for said valve, a supplemental circuit breaker in the circuit of the electric means for the emergency valve, and a controller for the supplemental circuit breaker operating on the establishing of a predetermined pressure in the brake cylinder.

46. In an air brake system, an electric triple provided with an electrically operated emergency valve moving to emergency position on the deënergization of the electric controlling means for said valve, a supplemental circuit breaker in the electric circuit of the emergency valve, an electro-magnetic means for moving the circuit breaker to the open position, circuit terminals in the circuit of the electro-magnet, a bridging conductor adapted to close the circuit through the terminals, a spring tending to move the bridging conductor away from the circuit terminals, and a piston connected to the pressure side of a brake cylinder for moving the circuit bridging conductor in opposition to the spring to close the circuit.

47. In an air brake system, an electric triple provided with an electrically operated emergency valve, a circuit breaker in this circuit of the electric means for the emergency valve, an electro-magnet for opening the circuit breaker, a brake cylinder, another cylinder connected thereto on the air pressure side of the brake cylinder, a piston on the second-named brake cylinder having one side constantly active to the pressure in the brake cylinder, a spring opposing the movement of the piston under air pressure, a bridging contact actuated by the piston, and circuit terminals in the path of the bridging contact and included in the circuit of the electro-magnet.

48. In an air brake system, a triple having a main piston provided with a hollow stem, a bushing closing the free end of said stem, a graduating valve having a stem extending through said bushing and there formed with a central bore and terminating in a head larger than the opening through the bushing, and a spring in the hollow stem of the valve tending to move the valve outward with relation to the stem of the piston.

49. In an air brake system, a triple having a main piston, a hollow stem or piston rod having an intermediate web dividing its interior into two compartments, a bushing closing one compartment, a graduating valve having its stem entering through the bushing into the compartment closed thereby and there formed with an expanded head, a spring housed in the hollow stem of the graduating valve and tending to project the latter, another spring housed in the other compartment of the piston rod or stem, and a buffer pin extending through the piston and coacting with the second-named spring.

50. In an air brake system, a triple having a main piston and provided with a conduit leading from the brake cylinder connection of the triple to a point of escape for the air, a slide valve for controlling said conduit and provided with an elongated seat, a piston rod or stem on the piston, and projecting parts on the piston rod engaging the seat in the slide valve and proportioned to permit limited movements of the piston without moving the slide valve.

51. In an air brake system, a triple having a main piston provided with a piston rod formed with an axial chamber, a bushing at the free end of the piston rod and provided with a head extending radially beyond the periphery of the piston rod, a graduating valve provided with a hollow stem entering the chamber of the piston rod through the bushing, a spring tending to project the graduating valve out of said chamber, a slide valve having an elongated seat or recess for the projecting portion of the bushing, said recess being longer than the said head or bushing to permit movements of the piston without actuating the slide valve, and a conduit between the brake cylinder connection of the triple and a point of escape for the air, said conduit being controlled by the slide valve.

52. In an air brake system, an electric triple provided with an electrically operated valve controlling the admission of air to the piston chamber containing the main piston, another electrically operated valve controlling the emergency exhaust port, another electrically operated valve controlling the service exhaust port, another electrically operated valve controlling the release port, another electrically operated valve controlling the straight air port to the piston chamber, another valve operated by air pressure only, and mechanically operated valves for converting the triple into either an automatic air triple or a straight air triple.

53. In an air brake system, an electric triple provided with a main piston and a chamber therefor, an electrically operated valve controlling the admission of air to the piston chamber, another electrically operated valve controlling the emergency exhaust port, another electrically operated valve controlling the service exhaust port, and another electrically operated valve controlling the release port.

54. In an air brake system, an electric triple provided with a main piston and a cylinder or chamber therefor, an electrically operated valve controlling the admission of air to the piston chamber, another electrically operated valve controlling the emergency exhaust port, another electrically operated valve controlling the service exhaust port, and another electrically operated valve for causing the movement of the release valve to the slow release position.

55. In an air brake system, an electrically operated triple provided with a main piston and a piston chamber, an electrically operated valve controlling the admission of air to the piston chamber, an electrically operated valve controlling the emergency exhaust port, an electrically operated valve controlling the service exhaust port, an electrically operated means for controlling the release valve, and a mechanically operated valve responsive to air pressure for feeding air to the piston chamber.

56. In an air brake system, an electrically operated triple having separate electrically operated means for controlling the admission of air to the main piston of the triple, the emergency exhaust port, the service exhaust port and the release port, and means for rendering the emergency controlling devices inactive to recall when an emergency application is once made until fully complete.

57. In an air brake system, a duplex brake cylinder adapted to be mounted upon the car truck, brake shoes, rock shafts carrying said brake shoes, and connections between each end of the brake cylinder and the corresponding rock-shaft carrying a pair of brake shoes.

58. An electric triple provided with means for actuating the valve to the several points of service, release, lap and emergency, and means for converting the electric triple into an air operated triple.

59. In an air brake system, an electrically operated triple having means for controlling it electrically in its movements to the several operative positions for either automatic or straight air control of the brakes, and other means for adapting the triple to movement to the several operative positions by air only.

In testimony that I claim the foregoing as my own, I have hereto affixed my signature in the presence of two witnesses.

WILLIAM C. MAYO.

Witnesses:
Wm. Adams,
A. I. Mortson.